United States Patent
Laier

(10) Patent No.: US 12,217,103 B2
(45) Date of Patent: Feb. 4, 2025

(54) LOCK RELEASE MANAGEMENT IN A DISTRIBUTED SYSTEM

(71) Applicant: Dell Products L.P., Round Rock, TX (US)

(72) Inventor: Max Laier, Seattle, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/156,834

(22) Filed: Jan. 19, 2023

(65) Prior Publication Data

US 2024/0248771 A1    Jul. 25, 2024

(51) Int. Cl.
     *G06F 9/52*      (2006.01)

(52) U.S. Cl.
     CPC .................... *G06F 9/528* (2013.01)

(58) Field of Classification Search
     CPC ...................................... G06F 9/528
     See application file for complete search history.

(56) References Cited

U.S. PATENT DOCUMENTS

| | | | |
|---|---|---|---|
| 7,447,786 B2 * | 11/2008 | Loaiza | G06F 9/526 |
| | | | 710/200 |
| 9,811,545 B1 | 11/2017 | Bent et al. | |
| 10,346,360 B1 | 7/2019 | Basov | |
| 2006/0136376 A1 * | 6/2006 | Jain | G06F 16/1774 |
| 2006/0200677 A1 * | 9/2006 | Marinescu | G06F 21/52 |
| | | | 713/182 |
| 2006/0282481 A1 * | 12/2006 | Zhou | G06F 16/2246 |
| 2007/0088919 A1 * | 4/2007 | Shen | G06F 12/0815 |
| | | | 711/E12.057 |
| 2011/0276549 A1 * | 11/2011 | Fathalla | G06F 16/2315 |
| | | | 707/704 |
| 2012/0330894 A1 * | 12/2012 | Slik | G06F 16/27 |
| | | | 707/626 |

(Continued)

OTHER PUBLICATIONS

Nick Trimbee "OneFS File Locking and Concurrent Access" Dell Technologies, https://infohub.delltechnologies.com/p/onefs-file-locking-and-concurrent-access/, Mar. 14, 2022, Last Accessed Apr. 19, 2023, 6 pages.

(Continued)

*Primary Examiner* — Henry Tsai
*Assistant Examiner* — Harry Z Wang
(74) *Attorney, Agent, or Firm* — Amin, Turocy & Watson, LLP

(57) ABSTRACT

Data lock transitioning associated with writing of files can be performed and managed. In connection with a write operation to write a portion of a file to a node of a node network, an access management component (AMC) can analyze file-related information indicative of a status associated with the portion of the file, wherein the status can relate to whether the file portion is associated with a streaming write, whether a protocol indication indicates a file handle associated with the file has been closed, or whether an advisory lock has been released by a client device. The AMC can determine whether to transition from an exclusive data lock associated with the portion of the file to a shared data lock with respect to the portion of the file, based on a result of analyzing the file-related information. The AMC can fine tune determinations or predictions of data lock transitions.

20 Claims, 10 Drawing Sheets

(56) References Cited

U.S. PATENT DOCUMENTS

2020/0334155 A1* 10/2020 Alshawabkeh ..... G06F 12/0862
2021/0073134 A1  3/2021 Allu et al.
2022/0004442 A1* 1/2022 Liguori ................. G06F 9/526

OTHER PUBLICATIONS

Office Action mailed Aug. 1, 2024 for U.S. Appl. No. 18/156,858, 52 pages.
Notice of Allowance mailed Dec. 2, 2024 for U.S. Appl. No. 18/156,858, 24 pages.

* cited by examiner

LOCK RELEASE MANAGEMENT IN A DISTRIBUTED SYSTEM

BACKGROUND

A group (e.g., cluster) of nodes can provide a set of services to clients. The nodes of the group can be connected to each other to form a distributed network of nodes. The set of services can include enabling clients to create a file and write data to the file in a node(s) of the group of nodes for storage in the node(s) or read data from a file stored in a node(s) of the group of nodes.

The above-described description is merely intended to provide a contextual overview regarding distributed node systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise, in connection with a write operation to write a portion of a file to a node of a distributed node network, analyzing, by a system comprising a processor, file-related information indicative of a status associated with the portion of the file. The method further can comprise determining, by the system, whether to transition from an exclusive data lock associated with the portion of the file to a shared data lock with respect to the portion of the file based at least in part on a result of the analyzing of the file-related information.

In certain embodiments, the disclosed subject matter can comprise a system that can include a memory that can store computer executable components, and a processor that can execute computer executable components stored in the memory. The computer executable components can comprise a node of a distributed network of nodes. The computer executable components also can comprise an access management component that, with regard to a section of a file written or being written to, and stored, in the node, analyze file-related data, which can be indicative of a status associated with the section of the file, and, based at least in part on a result of the analysis of the file-related data, can determine whether to switch from a first data lock associated with the section of the file to a second data lock with respect to the section of the file.

In still other embodiments, the disclosed subject matter can comprise a non-transitory machine-readable medium, comprising executable instructions that, when executed by a processor, can facilitate performance of operations. The operations can comprise, with regard to a write operation to write a section of a file to a node device of a distributed network of node devices, evaluating file-related data, that can be indicative of a status associated with the writing of the section of the file to the node device. The operations also can comprise determining whether to change an exclusive data lock mode associated with the section of the file to a shared data lock mode with respect to the section of the file based at least in part on a result of the evaluating of the file-related data.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
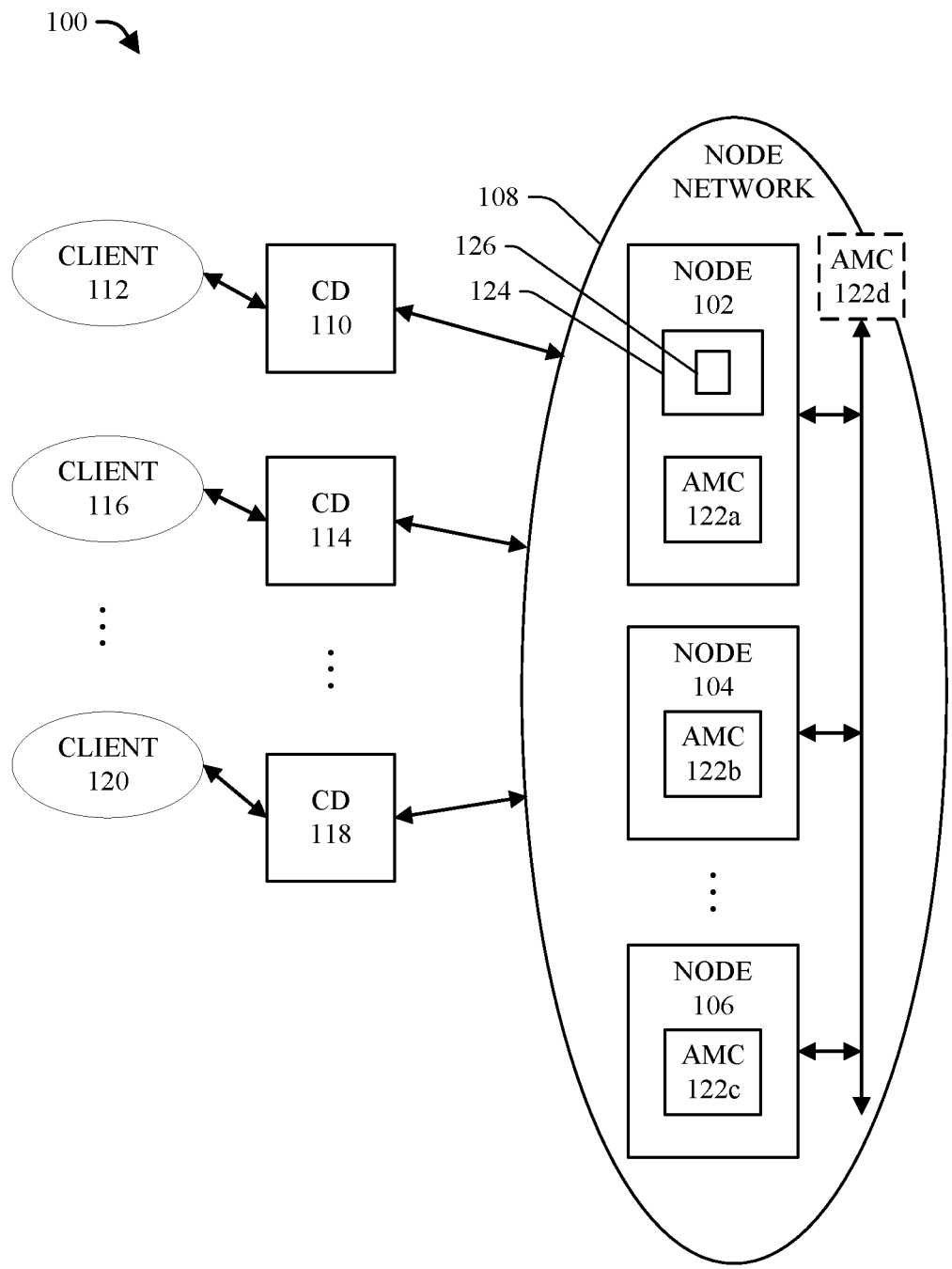
FIG. 1 illustrates a block diagram of an example system that can desirably perform and manage data lock transitioning associated with files in a node network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to distributed node systems, e.g., lock release management in a distributed system. A group (e.g., cluster) of nodes can provide a set of services to clients. The nodes of the group can be connected to each other to form a distributed network of nodes. The set of services can include enabling clients to create a file and write data to the file in a node(s) of the group of nodes for storage in the node(s) or read data from a file stored in a node(s) of the group of nodes.

Some types of distributed node systems (e.g., distributed node network systems) can employ different types of data locks to protect file data being written to and/or stored in nodes of such a distributed node system. For instance, there can be an exclusive data lock that can allow; to a client (e.g., user, client device, application, or other entity), exclusive access to a file, or portion thereof, stored in a node such that other clients can be denied access to the file, or portion thereof, while the exclusive data lock associated with that file, or portion thereof, is in place. There also can be a shared data lock that can allow clients, including clients other than the client who created the file, or portion thereof, to access and read the file, or portion thereof.

For instance, when a file is newly created by a client on a node of a distributed node system, the client (e.g., the writer of the file) can obtain exclusive access to the file, via the exclusive data lock, and start writing data to the file. The exclusive data lock can be cached (e.g., stored) on the node on which the writing of data took place. Once a reader (e.g., another client that wants to read the file) comes in on another node, the reader typically may have to request a shared data lock from a coordinator associated with the other node, and the coordinator, in turn, may have to revoke the exclusive data lock from the node on which the client (e.g., writer) was writing. The process of revoking an exclusive data lock from a client and providing a shared data lock for another client with respect to a file, or portion thereof, can have an undesirably significant latency cost.

This can be relevant in a number of situations, including, for example, in typical data pipeline applications where one process can stream data from an external source onto a shared file system (e.g., a distributed node system comprising a shared file system), and that data is processed by a compute cluster (e.g., one or more nodes of the distributed node system and/or one or more clients associated therewith) as soon as the data has fully landed on the storage system of the shared file system, and sometimes even before the data has fully landed on the storage system.

Existing approaches for situations involving an exclusive data lock on a file that is associated with a client (e.g., writer client), or portion thereof, where another client (e.g., reader client) desires to access and read the file, or portion thereof, include relying on a time out of a timer to release the exclusive data lock, advising customers to target clients that desire to access certain files to the same node, or relying on the undesirably costly three-way lock reclaim via the coordinator (e.g., reader client requests share lock, and coordinator initiates revoking of the exclusive data lock and providing a shared data lock). Such existing approaches for releasing an exclusive data lock and implementing a shared data lock with respect to a file, or portion thereof, can be undesirable, costly, and/or otherwise inefficient.

The disclosed subject matter can overcome these and other deficiencies of existing approaches for managing data locks associated with files, or portions thereof. To that end, techniques for desirably (e.g., efficiently, suitably, or optimally) managing data locks associated with files in node networks are presented. A system (e.g., a distributed node network system) can comprise a group of nodes that can be utilized to process information and provide services to clients (e.g., users and communication devices of users). In some embodiments, the nodes of the group of nodes can be associated with (e.g., communicatively connected to or networked with) the other nodes of the group of nodes.

In accordance with various embodiments, the disclosed subject matter can comprise an access management component (AMC) that can manage data locks associated with files in the node networks. For instance, in connection with a write operation to write a portion (e.g., section, chunk, or other portion) of a file to a node of a node network, the AMC can analyze file-related information indicative of a status associated with the portion of the file, wherein the status can relate to whether the portion of the file is associated with a streaming write and whether writing of the portion of the file to the node is complete, whether a protocol indication indicates a file handle associated with the file has been closed, or whether an advisory lock has been released by a client device. Based at least in part on a result of analyzing the file-related information, the AMC can determine whether to transition (e.g., proactively transition, switch, change, or downgrade) from an exclusive data lock associated with the portion of the file to a shared data lock with respect to the portion of the file. In certain embodiments, the AMC also can fine tune (e.g., adjust or modify) and enhance (e.g., improve or optimize) determinations or predictions of data lock transitions (e.g., proactive data lock transitions), such as described herein.

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) perform and manage data lock transitioning associated with files in a node network (e.g., a distributed node network), in accordance with various aspects and embodiments of the disclosed subject matter. The system 100 can comprise a group (e.g., cluster) of nodes (e.g., node equipment or devices), which can comprise a desired number of nodes, including node 102, node 104, and node 106. The nodes (e.g., 102, 104, and/or 106) can be grouped or networked together to form a node network 108, such as a distributed node network. The node network 108 can comprise a file system that can utilize one or more types of protocols to facilitate performance of data management, file management, data processing, file and data storage, file and data communications or transfers, and/or other file and data related functions and processes by the node network. The protocols employed by the node network can comprise virtually any desired protocol, such as, for example, network file system (NFS), server message block (SMB), common Internet file system (CIFS), Hadoop compatible file system (HCFS), file transfer protocol (FTP), or other desired protocol that can be utilized in file systems.

Each node (e.g., 102, 104, and/or 106) can comprise, employ, and/or access data processing resources (e.g., processor(s)), storage resources (e.g., data store(s)), applications, and/or other resources that can enable the node to perform one or more services. The one or more services can be or can relate to, for example, data processing, video streaming, audio streaming, data security or protection, multimedia service, news service, financial service, social networking, and/or another desired type of service. The nodes can be associated with (e.g., communicatively connected to) each other, for example, through a back-end network.

Each node (e.g., 102, 104, and/or 106) also can comprise a desired number of interfaces (e.g., network or interconnect interfaces), such as described herein. The interfaces of a node can be or can comprise network interfaces or other types of interfaces that can be associated with network addresses and can be utilized to facilitate (e.g., enable) transmitting or presenting information to a user (e.g., client or other user) or a device (e.g., a service server, another node, or a client or communication device, such as a computer, a server, or a mobile or smart phone), or receiving information (e.g., query or request for a service: or request for information) from a user, an application, a service server, or a communication device. Network addresses can be of various types, versions, and/or formats, which can comprise, for example, IP version 4 (IPv4) (e.g., an IPv4 address can be a 32-bit IPv4 address), IP version 6 (IPv6) (e.g., an IPv6 address can be a 128-bit IPv6 address), and/or other desired type, version, and/or format of network address.

At various times, client devices, such as client device (CD) 110 associated with client 112, client device 114 associated with client 116, and/or client device 118 associated with client 120, can be associated with (e.g., communicatively connected to, via a wired or wireless communication connection) respective nodes (e.g., 102, 104, and/or 106) of the node network 108. For instance, a client device (e.g., 110, 114, or 118) can be connected to a node (e.g., 102, 104, or 106) to write or communicate data (e.g., a query, sensor data, user data, application or service related data, or other data) to the node, or read or receive data (e.g., response to a query, sensor data, user data, application or service related data, or other data) from the node. A client (e.g., 112, 116, or 120) associated with a client device (e.g., 110, 114, or 118) can be a human user, a non-human user, a virtual assistant (VA), an application, a service, another client device, a device or system, or other entity.

The node network 108 (e.g., distributed node network system) can employ different types of data locks to protect file data being written to and/or stored in nodes (e.g., 102, 104, and/or 106) of the node network 108. The data locks can comprise an exclusive data lock (e.g., exclusive write data lock) that can allow; to a client device (e.g., 110, 114, or 118) or client (e.g., 112, 116, or 120), or other entity, exclusive access to a file, or portion (e.g., section, chunk, or other type of portion) thereof, stored in a node such that other client devices, clients, or entities can be denied access to the file, or portion thereof, while the exclusive data lock associated with that file, or portion thereof, is in place. Other types of exclusive data locks can include a mark lock and/or a snapshot lock, wherein the mark lock can be an exclusive lock resource that can be used to synchronize the marking and sweeping processes for a collect job engine job, and wherein the snapshot lock can be an exclusive lock that can synchronize the process of creating and deleting snapshots. The data locks also can comprise a shared data lock that can allow client devices, clients, or other entities, including those other than the client device or client who created the file, or portion thereof, to access and read (e.g., concurrently or simultaneously access and read) the file, or portion thereof. Other types of locks can include an advisory lock (e.g., higher level advisory lock associated with a client or client device), read lock, and/or other type of lock.

In some embodiments, in connection with an access operation with regard to a portion of a file, such as a write operation to write the portion of the file to a node (e.g., node 102), a client device (e.g., client device 110) can request an exclusive data lock with respect to the portion of the file from the node, which the node (e.g., employing an access management component (AMC) 122, such as described herein) can generate, and/or the node can otherwise initiate (e.g., self-initiate) and generate the exclusive data lock with respect to the portion of the file. The node can associate the exclusive data lock with the portion of the file (e.g., the node can store the exclusive data lock-related information in the node or otherwise associate the exclusive data lock with the portion of the file), and can implement and enforce the exclusive data lock with respect to the portion of the file (e.g., to deny access to other client devices (e.g., client devices 114 and/or 118)), such as described herein.

With regard to a shared data lock, a node (e.g., AMC 122 of a node, such as node 102) can implement and enforce a shared data lock (e.g., by transitioning from an exclusive data lock to the shared data lock) with respect to a portion of a file stored in or associated with the node in response to a request for a shared data lock for the portion of the file (e.g., in connection with a read or other access request to read or otherwise access the portion of the file) received from a client device (e.g., client device 114 or 118) via the node (e.g., node 102) or another node (e.g., node 104 or 106), when permitted, or as otherwise determined to be appropriate (e.g., appropriate for proactive transitioning from exclusive data lock to shared data lock) by the node (e.g., by the AMC 122 of the node), in accordance with defined access management criteria, such as described herein. When a shared data lock is to be implemented, the node can associate the shared data lock with the portion of the file (e.g., the node can store the shared data lock-related information in the node(s) or otherwise associate the shared data lock with the portion of the file), and the node(s) (e.g., node 102 and/or other nodes) can implement and enforce the shared data lock with respect to the portion of the file (e.g., to allow shared access to client devices (e.g., client devices 110, 114, and/or 118)), such as described herein.

Figure 2:
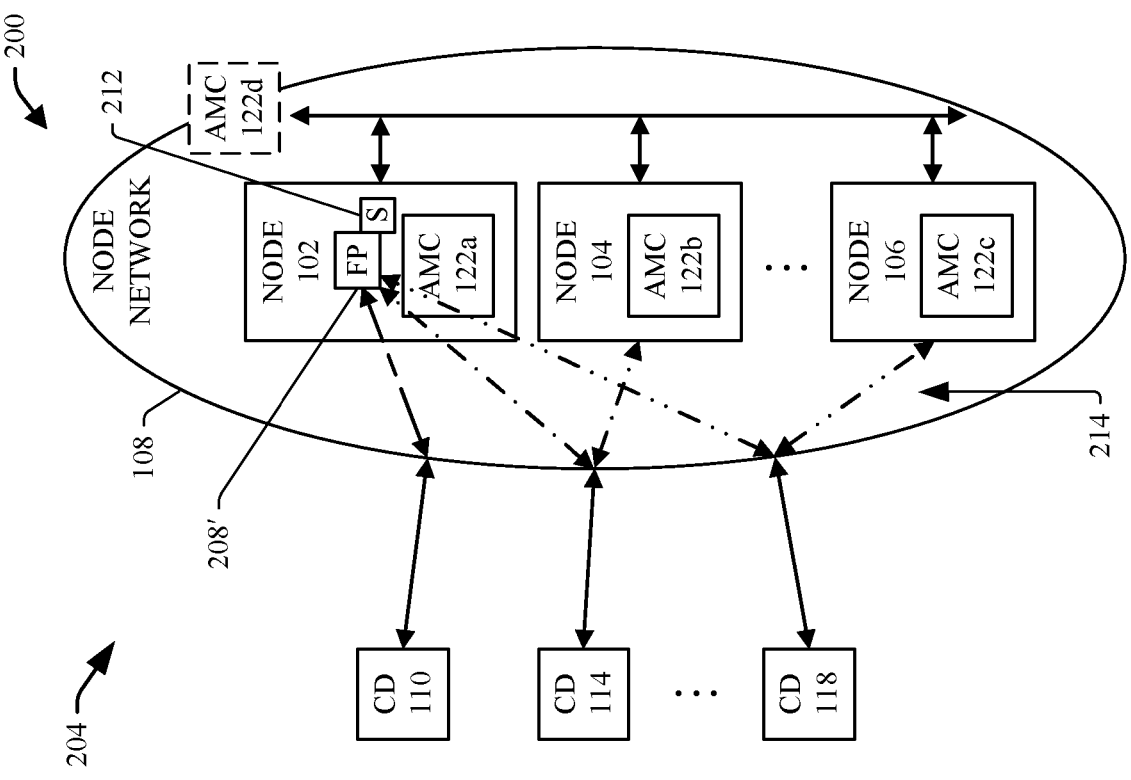
FIG. 2 depicts a block diagram of representations of data locks, such as an exclusive data lock and a shared data lock, in accordance with various aspects and embodiments of the disclosed subject matter.
Figure 2:
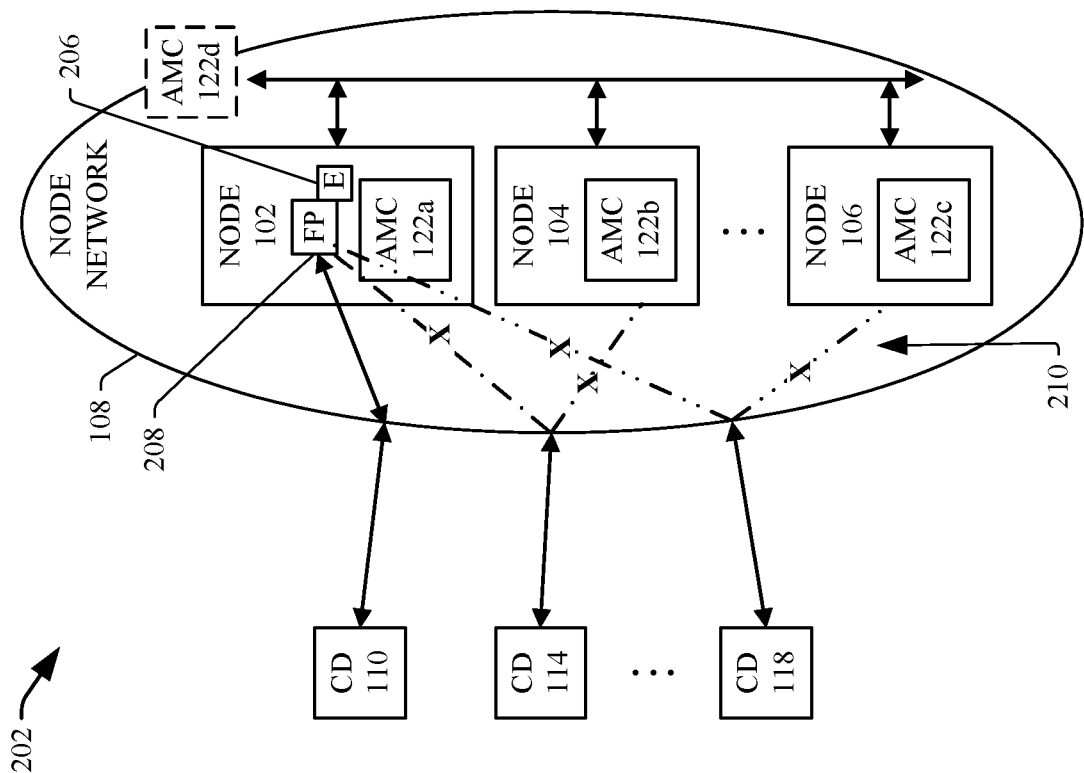

Referring briefly to FIG. 2 (along with FIG. 1), FIG. 2 depicts a block diagram of representations of data locks 200, such as an exclusive data lock and a shared data lock, in accordance with various aspects and embodiments of the disclosed subject matter. The representations of data locks 200 can comprise a representation of an exclusive data lock 202 and a representation of a shared data lock 204. With regard to the representation of the exclusive data lock 202, if the client device 110 has an exclusive data lock (E) 206 with regard to a portion of a file 208 (file portion (FP) (e.g., if the exclusive data lock 206 is associated with the portion of the file 208) during a write of the portion of the file 208 to the node 102, the AMC 122 can deny other client devices, such as client device 114 and client devices 118, access to the portion of the file 208, as indicated or represented at reference numeral 210 (and the "X" associated with the line associated with CD 114 and node 102, the "X" associated with the line associated with CD 114 and node 104, the "X" associated with the line associated with CD 118 and node 102, and the "X" associated with the line associated with CD 118 and node 106). For instance, if the client device 114 is connected to the node 104 (or node 102 or another node), and if there is an exclusive data lock 206 associated with the portion of the file 208, the exclusive data lock 206 can be enforced (e.g., by the AMC 122 or other component of a node) to deny the client device 114 access to the portion of the file 208 via the node 104 (or node 102 or another node). Also, if the client device 118 is connected to the node 106 (or node 102 or another node), and if there is an exclusive data lock 206 associated with the portion of the file 208, the exclusive data lock 206 can be enforced (e.g., by the AMC 122 or other component of a node) to deny the client device 118 access to the portion of the file 208 via the node 106 (or node 102 or another node).

With regard to the representation of the shared data lock 204, if the AMC 122 associates the shared data lock (S) 212 with the portion of the file 208' stored on the node 102 (e.g., after writing of the portion of the file 208 to the node 102 is determined to be complete, and the AMC 122 transitions the exclusive data lock 206 to the shared data lock 212), the AMC 122 can allow (e.g., grant) access (e.g., concurrent or simultaneous access) to the portion of the file 208' to client devices, such as client device 110, client device 114, and/or client devices 118, as indicated or represented at reference numeral 214 (and the line (with no "X") associated with CD 114 and node 102, the line (with no "X") associated with CD 114 and node 104, the line (with no "X") associated with CD 118 and node 102, and the line (with no "X") associated with CD 118 and node 106). For example, if the client device 110 is connected to the node 102 (or another node), if the client device 114 is connected to the node 104 (or node 102 or another node), and/or if the client device 118 is connected to the node 106 (or node 102 or another node), and if there is a shared data lock 212 associated with the portion of the file 208', the shared data lock 212 can be employed or enforced (e.g., by the AMC 122 or other component of a node) to allow shared access (e.g., shared, concurrent, or simultaneous access) to the portion of the file 208' such that, if desired, the client device 110 can gain (or maintain) access to the portion of the file 208' via the node 102 (or another node), the client device 114 can gain access to the portion of the file 208' (e.g., can read, copy, or otherwise access the portion of the file 208') via the node 104 (or node 102 or another node), and/or the client device 118 can gain access to the portion of the file 208' via the node 106 (or node 102 or another node).

As disclosed, the process of revoking an exclusive data lock from a client and providing a shared data lock for another client with respect to a file, or portion thereof, can have an undesirably significant latency cost. In a number of types of situations, it can be desirable to transition an exclusive data lock associated with a portion of a file to a shared data lock when possible (e.g., after the portion of the file has been written to a node) to enable other client devices and associated clients, or other entities, to access and read the portion of the file. As also disclosed, existing approaches (e.g., relying on a time out of a timer to release the exclusive data lock, advising customers to target clients that desire to access certain files to the same node, or relying on the undesirably costly three-way lock reclaim via a coordinator) for releasing or changing an exclusive data lock to implement a shared data lock with respect to a file, or portion thereof, can be undesirable, costly (e.g., an undesirable amount of latency), and/or otherwise inefficient.

The disclosed subject matter can overcome these and other deficiencies of existing approaches for handling of data locks. To that end, in accordance with various embodiments, the system 100 can employ the AMC 122, which can desirably (e.g., suitably, efficiently, reliably, enhancedly, or optimally) perform and manage transitioning (e.g., proactive transitioning, switching, changing, or downgrading) of data locks associated with files, or portions thereof, being written to nodes (e.g., 102, 104, or 106), such as transitioning an exclusive data lock associated with a portion (e.g., section, chunk, or other portion) of a file being written to a node (e.g., 102, 104, or 106) to a shared data lock (e.g., when writing of the portion of the file to the node is determined to be complete), in accordance with the defined access management criteria, such as described herein. In some embodiments, each node (e.g., 102, 104, 106) can comprise an AMC (e.g., AMC 122a, AMC 122b, and AMC 122c, respectively) that can perform and manage transitioning (e.g., proactive transitioning, switching, changing, or downgrading) of data locks associated with files, or portions thereof, being written to nodes (e.g., 102, 104, or 106). In other embodiments, an AMC 122 can reside in one (or more) of the nodes, or can be a standalone component (e.g., AMC 122d), or can reside in another device or component, wherein the AMC 122 can be associated with (e.g., communicatively connected to) all of the nodes, and can perform and manage data lock transitioning (e.g., between exclusive data lock to shared data lock) for all of the nodes of the node network 108.

Figure 3:
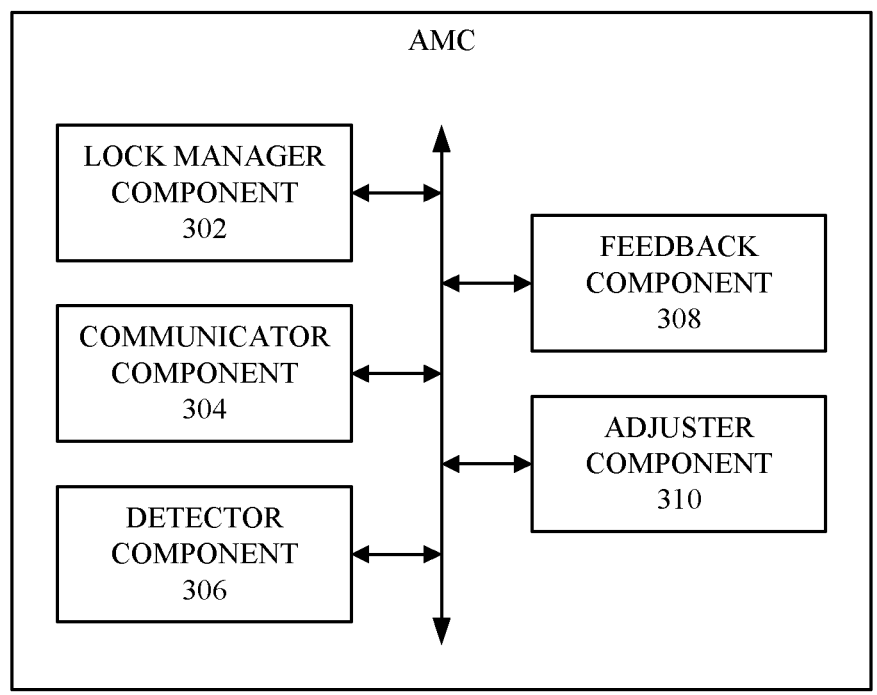
FIG. 3 illustrates a block diagram of an example access management component, in accordance with various aspects and embodiments of the disclosed subject matter.
Figure 4:
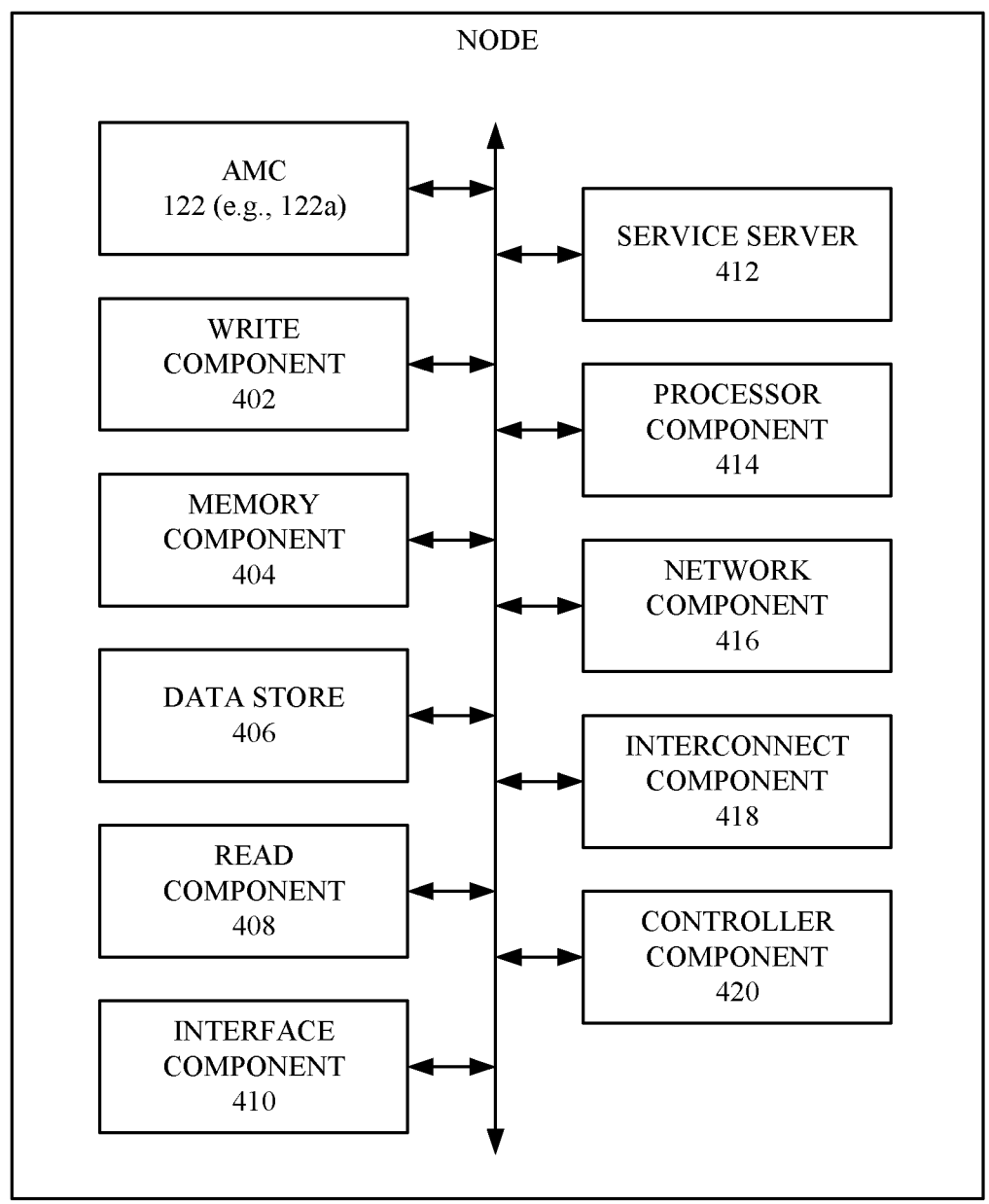
FIG. 4 depicts a block diagram of example node, in accordance with various aspects and embodiments of the disclosed subject matter.

Referring to FIGS. 3 and 4 (along with FIG. 1), FIG. 3 illustrates a block diagram of the AMC 122, and FIG. 4 depicts a block diagram of an example node 102, in accordance with various aspects and embodiments of the disclosed subject matter. In some embodiments, the AMCs (e.g., 122a, 122b, 122c) of the nodes (e.g., 102, 104, 106) of the node network 108, or a standalone AMC 122d, can comprise the same or similar components and functionality as the AMC 122, and/or can be configured the same as or similar to the AMC 122. In accordance with various embodiments, with regard to write or read operations associated with one node (e.g., node 102), the AMC (e.g., AMC 122a) of that node can act as the coordinator and manager of data locks associated with write operations to write files to that node, or another AMC (e.g., AMC 122b, AMC 122c, or AMC 122d) associated with another node (e.g., node 104 or node 106) or standalone can act as the coordinator and manager of data locks associated with write operations to write files to that node (e.g., node 102). In certain embodiments, the other nodes (e.g., 104, 106) of the node network 108 can comprise the same or similar components and functionality as the node 102, and/or can be configured the same as or similar to the node 102.

In connection with a write operation to write a file 124, comprising data, to the node 102, the node 102 can employ a write component 402 that can enable writing of the file 124 to the node 102 by the client device 110. While the client device 110 is writing the file 124, comprising data, to the node 102, the AMC 122, employing the lock manager component 302, can associate or implement an exclusive data lock with a portion 126 of the file 124 to grant the client device 110 exclusive access to the portion 126 (e.g., section, chunk, piece, or subset) of the file 124 (e.g., the lock manager component 302 can associate or implement respective exclusive data locks with respective portions of the file 124 as such respective file portions are being written to the node 102). In accordance with various embodiments, the file 124 can be written to a memory component 404 (e.g., cache memory of the memory component 404) of the node 102, with the file 124 being transferred (e.g., transferred from the memory component 404) or written to a data store 406 of the node 102 at a desired time (e.g., at a later time); or the file 124 can be written to the data store 406. In certain embodiments, after being written to the node 102, the file 124 can be stored in the memory component 404 and data store 406.

In connection with the write operation to write a file 124 to the node 102, the AMC 122 can receive (e.g., employing communicator component 304) the file-related information associated with the file 124, and can analyze the file-related information. The file-related information can be indicative of a status associated with the portion 126 of the file 124. In some embodiments, the file-related information can indicate whether the writing of the file 124 to the node 102 is a streaming write (e.g., has a streaming sequential write pattern), and, if so, whether the writing of the portion 126 of the file 124 to the node 102 is complete, such as described herein. In certain embodiments, the file-related information can comprise a protocol indication that can indicate whether a file handle associated with the file 124 has been closed, such as described herein. In still other embodiments, the file-related information can indicate whether an advisory lock (e.g., higher level advisory lock) has been released by the client device 110 that is writing the file 124 to the node 102, such as described herein. In yet other embodiments, the file-related information can indicate another type of status associated with the portion 126 of the file 124 that the AMC 122 can utilize to facilitate managing data lock transitions (e.g., transition between an exclusive data lock and a shared data lock) associated with portions of files (e.g., portion 126 of the file 124).

Based at least in part on the results of analyzing the file-related information, the AMC 122, employing the lock manager component 302, can determine whether to transition from the exclusive data lock associated with the portion 126 of the file 124 to the shared data lock with respect to the portion 126 of the file 124. If the lock manager component 302 determines that the exclusive data lock associated with the portion 126 of the file 124 is not to be transitioned to the shared data lock based at least in part on the analysis results and in accordance with the defined access management criteria, the lock manager component 302 can maintain the exclusive data lock associated with the portion 126 of the file 124. If, instead, the lock manager component 302 determines that the exclusive data lock associated with the portion 126 of the file 124 is to be transitioned to the shared data lock based at least in part on the analysis results and in accordance with the defined access management criteria, the lock manager component 302 can transition or initiate transition of the exclusive data lock to the shared data lock with respect to the portion 126 of the file 124.

As an example of data lock transition management, with regard to detection of a streaming write, based at least in part on the results of analyzing the file-related information, the AMC 122 (e.g., employing the lock manager component 302 and/or detector component 306) can determine or detect whether the write operation to write the file 124 to the node 102 is a streaming write (e.g., whether the write operation has a streaming write pattern), and, if so, whether the writing of the portion 126 of the file 124 to the node 102 is complete.

With regard to determining whether the write operation is a streaming write (e.g., streaming or sequential write), the detector component 306 can analyze the file-related information to determine whether at least a defined threshold number of portions (e.g., associated or linked sections, chunks, or other portions) of data (e.g., of a file) have been written to a node to indicate or demonstrate a streaming write pattern, in accordance with the defined access management criteria, which can specify or indicate the defined number of portions of data that have to be written to a node to qualify as or constitute a streaming write. For instance, the write component 402 (or other component of the node 102 or AMC 122) can employ a needle counter (or other type of indicator or tracker component) that can indicate or show where a last write of a file portion is and can indicate or show where the next write of a file portion is, and, if the write pattern is a streaming write pattern, and so on for other write portions, and if the needle counter (or other type of indicator or tracker component) indicates or shows a number of writes (e.g., consecutive or associated (e.g., linked) writes) of file portions that satisfies (e.g., meets or exceeds: or is at or greater than) the defined threshold number of writes of file portions, the detector component 306 or lock manager component 302 can determine that the write operation has a streaming write pattern and is a streaming write operation. If, instead, a next write of a file portion does not follow the previous write of a file portion, or if the number of writes of file portions that follow each other (e.g., that are consecutive or associated with each other) does not satisfy (e.g., does not meet or exceed: or is less than) the defined threshold number of writes of file portions, the detector component 306 or lock manager component 302 can determine that a streaming write pattern has not been detected for the write operation under consideration. In some embodiments, additionally or alternatively, respective metadata (e.g., identifiers associated with portions (e.g., data portions, sections, or chunks) of a file) also can be used and analyzed by the detector component 306 or lock manager component 302 to determine whether a write operation, comprising writing of a portion of a file, is a streaming write.

With regard to determining whether writing of the portion 126 of the file 124 to the node 102 is complete, in some embodiments, the detector component 306 can analyze the file-related information to determine (e.g., check, detect, or identify) whether all of the portions (e.g., bits, bytes, or other portions) of data associated with writing of the portion 126 of the file 124 to the node 102 have been written to and stored in the node 102. In other embodiments, the detector component 306 can employ another desired technique(s) or process(es) to determine whether writing of the portion 126 of the file 124 to the node 102 is complete based at least in part on the results of analyzing the file-related information.

The lock manager component 302 can determine whether to transition from the exclusive data lock associated with the portion 126 of the file 124 to the shared data lock, based at least in part on whether the write operation is a streaming write and/or whether the writing of the portion 126 of the file 124 to the node 102 is complete. If the lock manager component 302 or detector component 306 determines that the write operation is not a streaming write, the lock manager component 302 can determine that the exclusive data lock is not to be transitioned to the shared data lock with respect to the portion 126 of the file 124. Also, even if the lock manager component 302 or detector component 306 determines that the write operation is a streaming write, if the writing of the portion 126 of the file 124 to the node 102 is not complete, the lock manager component 302 can determine that the exclusive data lock is not to be transitioned to the shared data lock with respect to the portion 126 of the file 124. With the exclusive data lock in place for the portion 126 of the file 124, if another client device (e.g., 114 or 118) or other device attempts or requests to read the portion 126 of the file 124 from the node network 108 (e.g., via another node, such as node 104 or node 106), the lock manager component 302 can deny the other client device (e.g., 114 or 118) or other device access to the portion 126 of the file 124 and prevent the other client device or other device from reading the portion 126 of the file 124 from the node network 108 based at least in part on the exclusive data lock being associated with the portion 126 of the file 124 (or the lock manager component 302 can at least can make the other client device or other device wait until the exclusive data lock can be (e.g., is permitted to be) transitioned and has been transitioned to the shared data lock with respect to the portion 126 of the file 124 before allowing the other client device or other device to read the portion 126 of the file 124 from the node network 108).

If, instead, the lock manager component 302 or detector component 306 determines or detects that the write operation is a streaming write and determines or detects that the writing of the portion 126 of the file 124 to the node 102 (e.g., to the memory component 404 or data store 406 of the node 102) is complete, the lock manager component 302 can determine that the exclusive data lock can be transitioned (e.g., proactively transitioned, switched, changed, or downgraded) to the shared data lock with respect to the portion 126 of the file 124. Based at least in part on determining that the exclusive data lock can be transitioned, the lock manager component 302 can transition (e.g., proactively transition, switch, change, or downgrade) or initiate transition of the exclusive data lock to a shared data lock with respect to the portion 126 of the file 124. Once the shared lock is implemented, if a client device(s) (e.g., 110, 114, or 118) or other device(s) desires to read the portion 126 of the file 124 from the memory component 404 or data store 406 of the node 102, the AMC 122 can allow such client device(s) or other device(s) to access and read the portion 126 of the file 124 from the memory component 404 or data store 406 of the node 102 based at least in part on the shared data lock associated with the portion 126 of the file 124. The node 102, employing a read component 408, can facilitate (e.g., enable) the client device(s) (e.g., 110, 114, or 118) or other device(s) to read the portion 126 of the file 124 from the memory component 404 or data store 406 of the node 102, and the node 102 can provide the portion 126 of the file 124 to the client device(s) or other device(s).

As another example of data lock transition management, the AMC 122 can determine whether to transition from an exclusive data lock to a shared data lock with respect to the portion 126 of the file 124 based at least in part on a protocol indication associated with a file handle associated with the file 124. For instance, in connection with a write operation where the client device 110 is writing the file 124, or portion thereof, comprising data, to the node 102, the lock manager component 302 and/or the detector component 306 can analyze the file-related information, wherein the file-related information can relate to a protocol indication associated with a file handle associated with the file 124 being written to the node 102. The protocol can be virtually any desired protocol that can be employed by the node network 108, where such protocol can comprise, for example, NFS, SMB, CIFS, HCFS, FTP, or other desired protocol that can be utilized in file systems or for file storage. The protocol indication can be a type of protocol indication that corresponds to or is compatible with the applicable protocol employed by the node network 108.

Based at least in part on the result of analyzing the file-related information comprising or relating to the protocol indication associated with the file handle associated with the file 124, the lock manager component 302 or detector component 306 can determine whether the file handle associated with the file 124 has been closed.

If the lock manager component 302 or detector component 306 determines that the file handle associated with the file 124 has been closed, the lock manager component 302 can determine that the exclusive data lock can be transitioned to a shared data lock with respect to the portion 126 of the file 124. Based at least in part on determining that the exclusive data lock can be transitioned to a shared data lock with respect to the portion 126 of the file 124, the lock manager component 302 can transition (e.g., proactively transition, switch, change, or downgrade), or initiate or facilitate transition of, the exclusive data lock to the shared data lock with respect to the portion 126 of the file 124.

If, instead, the lock manager component 302 or detector component 306 determines that the file handle associated with the file 124 is not closed, the lock manager component 302 can determine that the exclusive data lock is not to be transitioned to a shared data lock with respect to the portion 126 of the file 124, at least at this time. In some embodiments, the AMC 122 can continue to monitor the write operation, and can receive and analyze additional file-related information relating to the write operation, including information relating to a protocol indication associated with the file handle associated with the file 124. If subsequent analysis of the additional file-related information indicates that the file handle associated with the file has been closed, the lock manager can determine that the exclusive data lock can be transitioned to a shared data lock with respect to the portion 126 of the file 124, and the lock manager component 302 can transition, or initiate or facilitate transition of, the exclusive data lock to the shared data lock with respect to the portion 126 of the file 124.

As still another example of data lock transition management, the AMC 122 can determine whether to transition from an exclusive data lock to a shared data lock with respect to the portion 126 of the file 124 based at least in part on a status of an advisory lock associated with the file 124. For instance, in connection with a write operation where the client device 110 is writing the file 124, or portion thereof, comprising data, to the node 102, the lock manager component 302 and/or the detector component 306 can analyze the file-related information, wherein the file-related information can comprise information (e.g., status information or other information) regarding or can relate to an advisory lock associated with the file 124. Based at least in part on the result of analyzing the file-related information, the lock manager component 302 or detector component 306 can determine whether there was or is an advisory lock associated with the file 124, and, if so, can determine whether the advisory lock associated with the file 124 has been released by the client device 110 or associated client 112.

If the lock manager component 302 or detector component 306 determines that there was an advisory lock associated with the file 124 and that advisory lock has been released by the client device 110 or client 112, the lock manager component 302 can determine that the exclusive data lock can be transitioned to a shared data lock with respect to the portion 126 of the file 124. Based at least in part on determining that the exclusive data lock can be transitioned to a shared data lock with respect to the portion 126 of the file 124, the lock manager component 302 can transition (e.g., proactively transition, switch, change, or downgrade), or initiate or facilitate transition of, the exclusive data lock to the shared data lock with respect to the portion 126 of the file 124.

If, instead, the lock manager component 302 or detector component 306 determines that there is an advisory lock associated with the file 124 and the advisory lock has not been released by the client device 110 or client 112, the lock manager component 302 can determine that the exclusive data lock is not to be transitioned to a shared data lock with respect to the portion 126 of the file 124, at least at this time. In some embodiments, the AMC 122 can continue to monitor the write operation, and can receive and analyze additional file-related information relating to the write operation, including information relating to the status of the advisory lock associated with the file 124. If the subsequent analysis of the additional file-related information by the lock manager component 302 or detector component 306 indicates that the advisory lock associated with the file 124 has been released by the client device 110 or client 112, the lock manager component 302 can determine that the exclusive data lock can be transitioned to a shared data lock with respect to the portion 126 of the file 124, and the lock manager component 302 can transition, or initiate or facilitate transition of, the exclusive data lock to the shared data lock with respect to the portion 126 of the file 124.

There may be instances where it can be desirable (e.g., wanted, suitable, or optimal) to be less aggressive in proactively transitioning from an exclusive data lock to a shared data lock with respect to a portion of a file, or, conversely, more aggressive in proactively transitioning from an exclusive data lock to a shared data lock with respect to a portion of a file. For instance, with regard to being less aggressive, if there are one or more instances where exclusive data locks associated with portions of files are being proactively transitioned to shared data locks with respective to portions of files in error, this can be an indication that it can be desirable, at least in some instances, to be less aggressive with regard to proactively transitioning from an exclusive data lock to a shared data lock with respect to a portion of a file. With regard to being more aggressive, if there are one or more instances where exclusive data locks associated with portions of files are being revoked due to action by a client device(s) (e.g., client device(s) 110, 114, and/or 118) or associated client (e.g., client(s) 112, 116, and/or 120) to revoke, or initiate or cause revoking of, an exclusive data lock, or due to timing out (e.g., a timer or defined amount of time associated with the exclusive data lock elapsing), this can be an indication that it can be desirable, at least in some instances, to be more aggressive with regard to proactively transitioning from an exclusive data lock to a shared data lock with respect to a portion of a file.

In accordance with various embodiments, the AMC 122 can monitor write operations, the statuses of data locks associated with write operations, and/or communications associated with write operations, and, based at least in part on the monitoring, the AMC 122, employing a feedback component 308, can receive (e.g., via the communicator component 304) feedback information relating to write operations, the statuses of data locks associated with write operations, and/or communications associated with write operations. For instance, if the AMC 122 had proactively transitioned from an exclusive data lock to a shared data lock with respect to a portion 126 of the file 124, but the client device 110 had not yet finished writing the portion 126 of the file 124 to the node 102, the feedback component 308 can receive feedback information from the client device 110 or client 112, a component (e.g., write component 402, interface component 410, service server 412, or other component) of the node 102, or another entity that can indicate that the writing of the portion 126 of the file 124 to the node 102 is not yet complete, and thus, the proactive transitioning of the exclusive data lock to the shared data lock with respect to the portion 126 of the file 124 was in error, or can otherwise indicate that such proactive transitioning to the shared data lock was not desirable (e.g., not wanted, not suitable, or not optimal). For example, if the writing of the portion 126 of the file 124 was not yet complete, but the AMC 122 had proactively transitioned from an exclusive data lock to a shared data lock with respect to a portion 126 of the file 124, the client device 110 or client 112, or a component of the AMC 122 or node 102, may request that the lock manager component 302 provide an exclusive data lock again for the writing of the portion 126 of the file 124 to the node 102, and that feedback information relating to the requesting of the exclusive data lock again can be received by the feedback component 308. Such request for an exclusive data lock again can indicate that the writing of the portion 126 of the file 124 was not complete (e.g., not finished) and the data lock transition was in error or can otherwise indicate that the data lock transition was not desirable.

In some embodiments, to facilitate detection, by the detector component 306 or an adjuster component 310 of the AMC 122, of a false or erroneous determination or prediction to proactively transition from an exclusive data lock to a shared data lock with respect to a portion of a file, the lock manager component 302 can generate metadata, such as a lock change indicator (e.g., a proactive lock transition or change indicator), and can store the metadata in the memory component 404 or data store 406 of the node 102, wherein the lock manager component 302 can associate (e.g., link, map, or otherwise associate) the metadata with the shared data lock, and wherein the metadata can be or can provide an indicator or hint that the exclusive data lock had been proactively transitioned to the shared data lock with respect to the portion 126 of the file 124. If the feedback component 308 receives feedback information (e.g., a request for an exclusive data lock again to write the portion 126 of the file 124) indicating that the determination or prediction to proactively transition from the exclusive data lock to shared data lock with respect to the portion 126 of the file 124 was in error or otherwise undesired, the detector component 306 or the adjuster component 310 can receive such feedback information, and also can obtain (e.g., read or retrieve) the metadata associated with the shared data lock from the memory component 404 or data store 406. The detector component 306 or the adjuster component 310 can analyze the feedback information and the metadata. Based at least in part on the result of analyzing the feedback information and the metadata, the detector component 306 or the adjuster component 310 can detect or determine that the determination or prediction to proactively transition the exclusive data lock to shared data lock with respect to the portion 126 of the file 124 was in error or otherwise undesired.

In response to detecting that the determination or prediction to proactively transition from the exclusive data lock to the shared data lock with respect to the portion 126 of the file 124 was in error or otherwise undesired, the adjuster component 310 can analyze the feedback information and/or historical information relating to data lock transition determinations or predictions, including previous data lock transition determinations or predictions (if any) that were determined to be in error or otherwise undesirable, wherein the historical information can be stored in the data store 406. Based at least in part on the result of analyzing the feedback information and/or the historical information, the adjuster component 310 can determine whether to adjust a data lock transition criterion or parameter for determining or predicting when it can be desirable (e.g., wanted, suitable, or optimal) to transition from an exclusive data lock to a shared data lock with respect to a portion of a file (e.g., a subsequent write operation involving a portion of another file), in accordance with the defined access management criteria.

In some instances, based at least in part on the result of analyzing the feedback information and/or the historical information, the adjuster component 310 may determine that no adjustment to a data lock transition criterion or parameter for determining or predicting whether to transition from an exclusive data lock to a shared data lock is desired (e.g., wanted, suitable, or warranted), at least at this time, when determining that no such adjustment is desired is in accordance with the defined access management criteria relating to data lock transition determinations or predictions and adjustments thereto. For example, if the defined access management criteria indicates or specifies that no adjustment to a data lock transition criterion or parameter is to be performed if only a single instance of an erroneous transition from an exclusive data lock to a shared data lock has been detected (e.g., ever or within a defined amount of time prior to the detection of such single instance of erroneous transition), or if a number of instances of erroneous transitions from an exclusive data lock to a shared data lock that does not satisfy (e.g., is below) a defined threshold number of instances or erroneous transition from an exclusive data lock to a shared data lock (e.g., ever, or over a defined amount of time prior to the current instance of erroneous transition), the adjuster component 310 can determine that no adjustment to a data lock transition criterion or parameter, which relates to determining or predicting whether to transition from an exclusive data lock to a shared data lock, is to be performed and will not perform an adjustment of a data lock transition criterion or parameter, at least at this time, in accordance with the applicable defined access management criteria.

In other instances, if the defined access management criteria instead indicates or specifies that if a single instance of an erroneous transition from an exclusive data lock to a shared data lock has been detected (e.g., ever or within a defined amount of time prior to the detection of such single instance of erroneous transition), the adjuster component 310 can determine that an adjustment to a data lock transition criterion or parameter, which relates to determining or predicting whether to transition from an exclusive data lock to a shared data lock, is to be performed and will perform an adjustment of the data lock transition criterion or parameter, in accordance with the applicable defined access management criteria. In such other instances, the adjuster component 310 can adjust one or more data lock transition criteria or parameters that can cause the lock manager component 302 and/or detector component 306 to be less aggressive in determining or predicting that an exclusive data lock is to be transitioned to a shared data lock with respect to a portion of a file during a write operation. For example, the adjuster component 310 can adjust one or more data lock transition criteria or parameters that can cause the lock manager component 302 and/or detector component 306 to be less aggressive in determining or predicting that a write operation is a streaming write operation (e.g., determine that a threshold number of associated writes of portions of a file to a node for determining or predicting a write pattern is a streaming write pattern is to be increased) and/or determining or predicting that writing of a portion of a file to a node is complete in connection with determining or predicting that an exclusive data lock is to be transitioned to a shared data lock with respect to the portion of the file during the write operation.

With further regard to determining whether to be more aggressive in determining, predicting, or implementing proactive data lock transitions to transition from an exclusive data lock to a shared data lock with respect to portions of files, the AMC 122 (e.g., the adjuster component 310 or other component of the AMC 122) can monitor and/or track write operations associated with nodes (e.g., nodes 102, 104, and/or 106) of the node network 108. Based at least in part on the monitoring, the AMC 122 can receive (e.g., via communicator component 304) feedback information relating to write operations and/or data lock transitions from one or more of client devices (e.g., 110, 114, and/or 118), clients (e.g., 112, 116, and/or 120), components (e.g., write component 402, interface component 410, service server 412, or other component) of nodes, and/or another entity. The feedback information can comprise, for example, a request from a client device or client to revoke (e.g., remove or release) an exclusive data lock associated with a portion of a file, information indicating an exclusive data lock associated with a portion of a file has timed out (e.g., a timer or defined amount of time associated with the exclusive data lock has elapsed), and/or other type of information or indicator that can indicate that an exclusive data lock associated with a portion of a file has terminated or is no longer desired before or without a transition to a shared data lock with respect to such portion of the file.

Based at least in part on the results of analyzing such feedback information, the adjuster component 310 can determine whether one or more data lock transition criteria or parameters are to be adjusted to cause the AMC 122 to be more aggressive in determining, predicting, or implementing proactive data lock transitions to transition from an exclusive data lock to a shared data lock with respect to portions of files. If the analysis results do not indicate that the data lock transitions should be more aggressive than they currently are (e.g., because the analysis results indicate or show that the number of events of exclusive data locks timing out is less than a defined threshold number of events of the exclusive data locks timing out, and the number of requests to revoke an exclusive data lock is less than a defined threshold number of requests to revoke an exclusive data lock), in accordance with the defined access management criteria, the adjuster component 310 can determine that the data lock transition criteria and parameters are not to be adjusted to increase (or decrease) the aggressiveness of the AMC 122 in determining, predicting, or implementing (e.g., the data lock transition criteria and parameters are not to be adjusted to cause the AMC 122 to be more likely, or to more frequently, determine, predict, or implement) proactive data lock transitions to transition from an exclusive data lock to a shared data lock with respect to portions of files.

If, instead, the analysis results indicate that the data lock transitions should be more aggressive than they currently are (e.g., because the analysis results indicate or show that the number of events of exclusive data locks timing out satisfy (e.g., is at or greater than) the defined threshold number of events of the exclusive data locks timing out, and/or the number of requests to revoke an exclusive data lock satisfy (e.g., is at or greater than) the defined threshold number of requests to revoke an exclusive data lock), in accordance with (e.g., as indicated or specified by) the defined access management criteria, the adjuster component 310 can determine that the data lock transition criteria and parameters are to be adjusted to increase the aggressiveness of the AMC 122 in determining, predicting, or implementing (e.g., the data lock transition criteria and parameters are to be adjusted to cause the AMC 122 to be more likely, or to more frequently, determine, predict, or implement) proactive data lock transitions to transition from an exclusive data lock to a shared data lock with respect to portions of files.

The adjuster component 310 can monitor and track feedback information, and can make adjustments (if any) to data lock transition criteria and/or parameters, based at least in part on the client (e.g., 112, 116, or 120), the client device (e.g., 110, 114, or 118), the node (e.g., 102, 104, or 106), the type of data associated with the file(s) that is associated with the event(s) involving an undesired (e.g., erroneous, unwanted, or otherwise undesired) data lock transition or involving a timeout of an exclusive data lock or a request to revoke an exclusive data lock, a number of writes (e.g., consecutive or associated write sub-operations) that occurred, and/or or other characteristic (e.g., attribute, property, or parameter), in accordance with the defined access management criteria. In accordance with various embodiments, depending on the defined access management criteria, a determination by the adjuster component 310 that data lock transition criteria and/or parameters are to be adjusted can be applicable to a first client, a first client device, a first node, a first type of data, or another first type of characteristic, and not other clients, client devices, nodes, types of data, or other types of characteristics: or can be applicable to more than one client, client device, node, type of data, or other type of characteristic.

As an example, if, based at least in part on the results of analyzing feedback information, the adjuster component 310 determines that there is a significant number of erroneous or undesired data lock transition events associated with one particular node (e.g., node 102) where such number satisfies the defined threshold number of erroneous or undesired data lock transition events, but the other nodes (e.g., nodes 104 and 106) of the node network 108 are not experiencing a significant number of erroneous or undesired data lock transition events, the adjuster component 310 can determine that one or more data lock transition criteria and/or parameters are to be adjusted to decrease the aggressiveness of proactive data lock transitions associated with that particular node (e.g., node 102) to mitigate or reduce the number of erroneous or undesired data lock transition events associated with that particular node, but other data lock transition criteria and/or parameters associated with the other nodes (e.g., nodes 104 and 106) do not have to be adjusted (e.g., the level of aggressiveness of proactive data lock transitions associated with the other nodes can remain the same).

As another example, if, based at least in part on the results of analyzing feedback information, the adjuster component 310 determines that there is a significant number of erroneous or undesired data lock transition events associated with one particular client device (e.g., client device 110) across multiple nodes (e.g., nodes 102, 104, and/or 106) where such number satisfies the defined threshold number of erroneous or undesired data lock transition events, but the other client devices (e.g., client devices 114 and 118) are not experiencing a significant number of erroneous or undesired data lock transition events, the adjuster component 310 can determine that one or more data lock transition criteria and/or parameters are to be adjusted to decrease the aggressiveness of proactive data lock transitions associated with that particular client device (e.g., client device 110) across the multiple nodes (e.g., nodes 102, 104, and/or 106) (or all of the nodes) to mitigate or reduce the number of erroneous or undesired data lock transition events associated with that particular client device, but other data lock transition criteria and/or parameters associated with the other clients devices (e.g., client devices 114 and 118) do not have to be adjusted (e.g., the level of aggressiveness of proactive data lock transitions associated with the other client devices can remain the same).

The nodes (e.g., 102, 104, and/or 106), and associated AMCs (e.g., 122a, 122b, 122c, and/or 122d), can communicate, coordinate, and/or synchronize with each other with regard to data lock transition determinations or predictions, and adjustments to data lock transition determinations or predictions (e.g., adjustments to data lock transition criteria and/or parameters to adjust data lock transition determinations or predictions), or corresponding access management criteria.

With further regard to the node 102 (e.g., of FIG. 4), in accordance with various embodiments, in addition to the AMC 122 (e.g., 122a), the write component 402, memory component 404, data store 406, read component 408, interface component 410, and service server 412, the node 102 can comprise a processor component 414, network component 416, interconnect component 418, controller component 420, and/or other desired components.

The processor component 414 can include can work in conjunction with the other components (e.g., AMC 122a, write component 402, memory component 404, data store 406, read component 408, interface component 410, service server 412, network component 416, interconnect component 418, controller component 420, and/or another component) to facilitate performing the various functions of the node 102. The processor component 414 can employ one or more processors (e.g., one or more CPUs), microprocessors, or controllers that can process information relating to data (e.g., file data or other data), files, file systems, communication connection operations, read operations, write operations, data storage operations, data locks, data lock transitions, data or file search operations, nodes, network of nodes, service servers, clients or other entities, communication (e.g., client or other communication) devices, network addresses, interface identifiers, node identifiers, applications, operating systems, hardware or virtual platforms, characteristics associated with applications, preferences (e.g., user or client preferences), services, hash values, metadata, parameters, traffic flows, policies, defined access management criteria, algorithms (e.g., access management algorithms, hash algorithms, data compression algorithms, data decompression algorithms, and/or other algorithm), protocols, interfaces, tools, and/or other information, to facilitate operation of the node 102, and control data flow between the node 102 and other components (e.g., another node(s), AMC, communication device, service server, file system, or other component) associated with the node 102.

The network component 416 can comprise network sub-components (e.g., Ethernet component (e.g., Ethernet ports and associated Ethernet sub-components), wireless communication connection component, or other network sub-component) that can enable the node 102 to network and communicate with one or more other nodes (e.g., nodes associated with a cluster), the AMC (e.g., AMC(s) of another node(s)), communication devices, service servers (e.g., service server(s) of another node(s)), and/or other components or devices. The network can employ IP for node-to-node communication between the node 102 and other nodes (e.g., other nodes associated with the cluster) associated with the node 102. For instance, a cluster of nodes of the storage system can comprise a back-end network, which can act as a backplane for the cluster, wherein can enable isolating node-to-node communication (e.g., between the node 102 and other nodes associated with the cluster) to a private, high-speed, low-latency network. The node 102 can support and utilize desired network communication protocols to communicate with other components or devices in a communication network (e.g., Internet, intranet, customer network, or other type of communication network), wherein the network communication protocols can comprise, for example, NFS, SMB, hypertext transfer protocol (HTTP), file transfer protocol (FTP), Hadoop distributed file system (HDFS), OpenStack Swift, and/or other desired network communication protocols. The network component 416 also can comprise IP functionality that can allow the network component 416 and associated storage system to utilize communication protocols, such as IPv4 and IPv6, and be fully integrated with IPv4 and IPv6 environments. The node 102 can be associated with (e.g., assigned) respective IP addresses, including virtual IP addresses, that can be employed to facilitate enabling the node 102 to connect to client devices, other nodes, service servers, the NMC, and/or other components or devices. If the node 102 is offline for any reason, the IP addresses (e.g., virtual IP addresses) of the node 102 can be migrated (e.g., moved or transferred) to another node associated with the cluster (e.g., another node associated with a network of the cluster) to facilitate redistributing client devices to other nodes associated with the cluster if the node 102 is offline.

The interconnect component 418 can be associated with the network component 416 and/or other components to facilitate providing desired interconnects to the network component 416 and/or the other components. For instance, in some embodiments, a portion of the interconnect component 418 can be part of the network component 416. The interconnect component 418 can comprise various types of interconnects (e.g., interconnect sub-components) that can be utilized to connect the node 102 to other nodes of the cluster of nodes, connect various components (e.g., AMC 122a, write component 402, memory component 404, data store 406, read component 408, interface component 410, service server 412, processor component 414, network component 416, controller component 420, and/or another component) of the node 102, or connect the node 102 to other components (e.g., another node(s), AMC, client or communication device, service server, file system, or other component) of or associated with the storage system. The interconnects can comprise, for example, Ethernet interconnects or other low-latency interconnects (e.g., low-latency Infini-Band interconnects) that can be utilized to provide desirably fast and low-latency connections between respective components of or associated with the node 102. For instance, the memory component 404 (e.g., memory cache of the memory component 404) can communicate via a desirably fast (e.g., low-latency) interconnect (e.g., internal interconnect) of the interconnect component 418 to another memory component(s) of another node(s) of the cluster of nodes to desirably communicate or otherwise make available the data in the memory component 404 to the other memory component(s) or to access data in the other memory component(s), wherein such interconnect can have a significantly lower latency than accessing a hard disk drive of a node. The interconnect component 418 also can comprise desirably fast interconnects between different memory sub-components (e.g., different caches) of the memory component 404.

The controller component 420 can be or can comprise a disk controller that can enable the processor component 414, or portion thereof, to communicate with the data store 406 (e.g., a hard disk of the data store 406) or other type of storage media or storage drive (e.g., disk drive) of or associated with the node 102. The controller component 420 also can provide or facilitate providing an interface between the hard disk or disk drive and other components of the node 102.

With further regard to the memory component 404, the memory component 404 can include one or more volatile or non-volatile memory sub-components (e.g., cache memory) that can be utilized to store data, such as the various types of data disclosed herein. The memory sub-components of the memory component 404 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), non-volatile RAM (NVRAM), and/or other desired type of memory. One or more memory sub-components can be one or more caches.

With further regard to the data store 406, the data store 406 can store data structures (e.g., user data, metadata), code structure(s) (e.g., modules, objects, hashes, classes, procedures) or instructions, information relating to data (e.g., file data or other data), files, file systems, communication connection operations, read operations, write operations, data storage operations, data locks, data lock transitions, data or file search operations, nodes, network of nodes, service servers, clients or other entities, communication (e.g., client or other communication) devices, network addresses, interface identifiers, node identifiers, applications, operating systems, hardware or virtual platforms, characteristics associated with applications, preferences (e.g., user or client preferences), services, hash values, metadata, parameters, traffic flows, policies, defined access management criteria, algorithms (e.g., access management algorithms, hash algorithms, data compression algorithms, data decompression algorithms, and/or other algorithm), protocols, interfaces, tools, and/or other information, to facilitate controlling operations associated with the node 102. The data store 406 can comprise volatile and/or non-volatile memory, such as described herein. In an aspect, the processor component 414 can be functionally coupled (e.g., through a memory bus) to the data store 406 in order to store and retrieve information desired to operate and/or confer functionality, at least in part, to the AMC 122a, write component 402, memory component 404, data store 406, read component 408, interface component 410, service server 412, processor component 414, network component 416, interconnect component 418, controller component 420, and/or another component, and/or substantially any other operational aspects of the node 102.

With further regard to the interface component 410, the interface component 410 can comprise various interfaces, such as, for example, network interfaces, application programming interfaces (APIs), interconnect interfaces, communication interfaces, a display screen, display interfaces, audio interfaces, haptic interface, and/or other desired interfaces, to facilitate (e.g., enable) transmitting or presenting information to a user or a device (e.g., service server, another node, or client or communication device, such as a computer, server, or mobile (e.g., smart) phone), or receiving information (e.g., query or request for a service: or request for information) from a service server or the AMC.

With further regard to the service server 412, the service server 412 can facilitate handling client requests received from communication devices and provisioning services for the communication devices in response to the client requests. In some embodiments, the service server 412 can be an SMB server that can employ a desired SMB protocol to facilitate establishing SMB sessions. For example, the service server 412 can employ the desired SMB protocol to facilitate servicing client requests with regard to data stored on the node. In other embodiments, the service server 412 can be or can comprise a different type of service server, such as an NFS server that can comprise a distributed file system and can employ an NFS protocol that can enable the sharing of file directories and files with clients over the node network. Users (e.g., clients) can, for example, add files to a shared file directory, and those files are able to be shared with other users who have access to that file directory. It is to be appreciated and understood that, in other embodiments, the node 102 can comprise one or more other types of service servers, in addition to or as an alternative to service server 412.

The disclosed subject matter (e.g., the systems, methods, and techniques described herein), by employing an AMC and the techniques described herein that can desirably (e.g., suitably, efficiently, enhancedly, or optimally) manage transitions (e.g., proactive transitions, changes, or downgrades) of exclusive data locks to shared data locks with respective portions of files, can provide a number of advantages over existing techniques relating to data locks. For instance, the AMC and the techniques described herein can desirably reduce latency costs associated with changing from an exclusive data lock to a shared data lock for a portion of a file by proactively transitioning from an exclusive data lock to a shared data lock with respect to a portion of a file when it is determined to be appropriate or possible (e.g., when a sequential write pattern is detected and it is determined that the writing of the portion of the file is complete), as compared to existing systems, methods, and techniques, such as waiting for a timer associated with an exclusive data lock to elapse before transitioning from the exclusive data lock to a shared data lock for a portion of a file, advising customers to target clients that desire to access certain files to the same node, or relying on an undesirably costly three-way lock reclaim via a coordinator. The AMC and the techniques described herein also can desirably enhance (e.g., improve, increase, or optimize) performance of a network of nodes with regard to processing of data (e.g., file data or other data), and making data available or providing data to clients, as compared to existing systems, methods, and techniques.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 5-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 5:
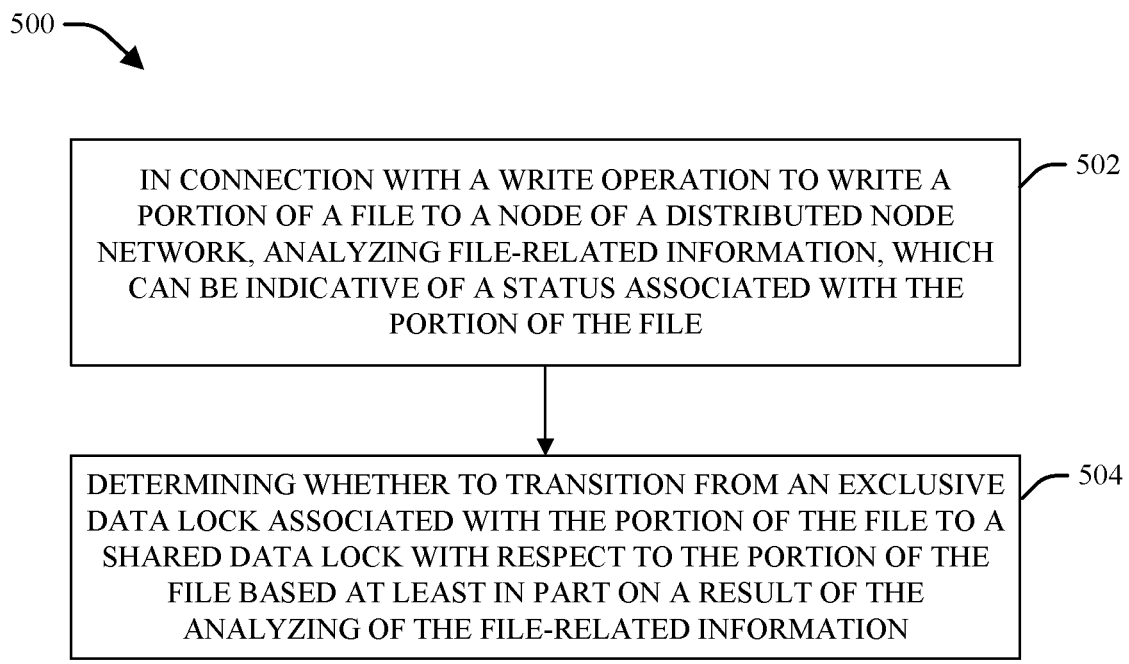
FIG. 5 illustrates a flow chart of an example method that can desirably manage transitioning an exclusive data lock associated with a portion of a file to a shared data lock, in accordance with various aspects and embodiments of the disclosed subject matter.

FIG. 5 illustrates a flow chart of an example method 500 that can desirably (e.g., suitably, efficiently, or optimally) manage transitioning (e.g., proactively transitioning) an exclusive data lock associated with a portion of a file to a shared data lock, in accordance with various aspects and embodiments of the disclosed subject matter. The method 500 can be employed by, for example, a system comprising the AMC, a processor component (e.g., of or associated with the AMC), and/or data store (e.g., of or associated with the AMC and/or the processor component).

At 502, in connection with a write operation to write a portion of a file to a node of a distributed node network, file-related information, which can be indicative of a status associated with the portion of the file, can be analyzed. In connection with the write operation, while a client device is writing the file, comprising data, to the node, the AMC can associate an exclusive data lock with the file, or portion thereof, to grant the client device exclusive access to the file, or portion thereof, such as described herein. In connection with the write operation, the AMC can receive the file-related information, and can analyze the file-related information. The file-related information can be indicative of the status associated with the portion (e.g., section, piece, or subset) of the file. In some embodiments, the file-related information can indicate whether the writing of the file to the node is a streaming write (e.g., has a streaming sequential write pattern), and, if so, whether the writing of the portion of the file is complete. In certain embodiments, the file-related information can comprise a protocol indication that can indicate whether a file handle associated with the file has been closed. In still other embodiments, the file-related information can indicate whether an advisory lock (e.g., higher level advisory lock) has been released by a client device that is writing the file to the node.

At 504, a determination can be made regarding whether to transition from an exclusive data lock associated with the portion of the file to a shared data lock with respect to the portion of the file based at least in part on a result of the analyzing of the file-related information. The AMC can determine whether to transition from the exclusive data lock associated with the portion of the file to the shared data lock with respect to the portion of the file, based at least in part on a result of the analyzing of the file-related information. For example, based at least in part on a result of the analyzing of the file-related information, the AMC can determine whether the write operation is a streaming write (e.g., whether the write operation has a streaming write pattern), and, if so, whether the writing of the portion of the file to the node is complete. The AMC can determine whether to transition from the exclusive data lock associated with the portion of the file to the shared data lock with respect to the portion of the file, based at least in part on whether the write operation is a streaming write and/or whether the writing of the portion of the file to the node is complete, such as described herein. If the AMC determines that the write operation is not a streaming write, the AMC can determine that the exclusive data lock is not to be transitioned to the shared data lock. Also, even if the AMC determines that the write operation is a streaming write, if the writing of the portion of the file to the node is not complete, the AMC can determine that the exclusive data lock is not to be transitioned to the shared data lock. If, instead, the AMC determines that the write operation is a streaming write and determines that the writing of the portion of the file to the node is complete, the AMC can determine that the exclusive data lock can be transitioned (e.g., proactively transitioned, switched, changed, or downgraded) to the shared data lock with respect to the portion of the file.

Figure 6:
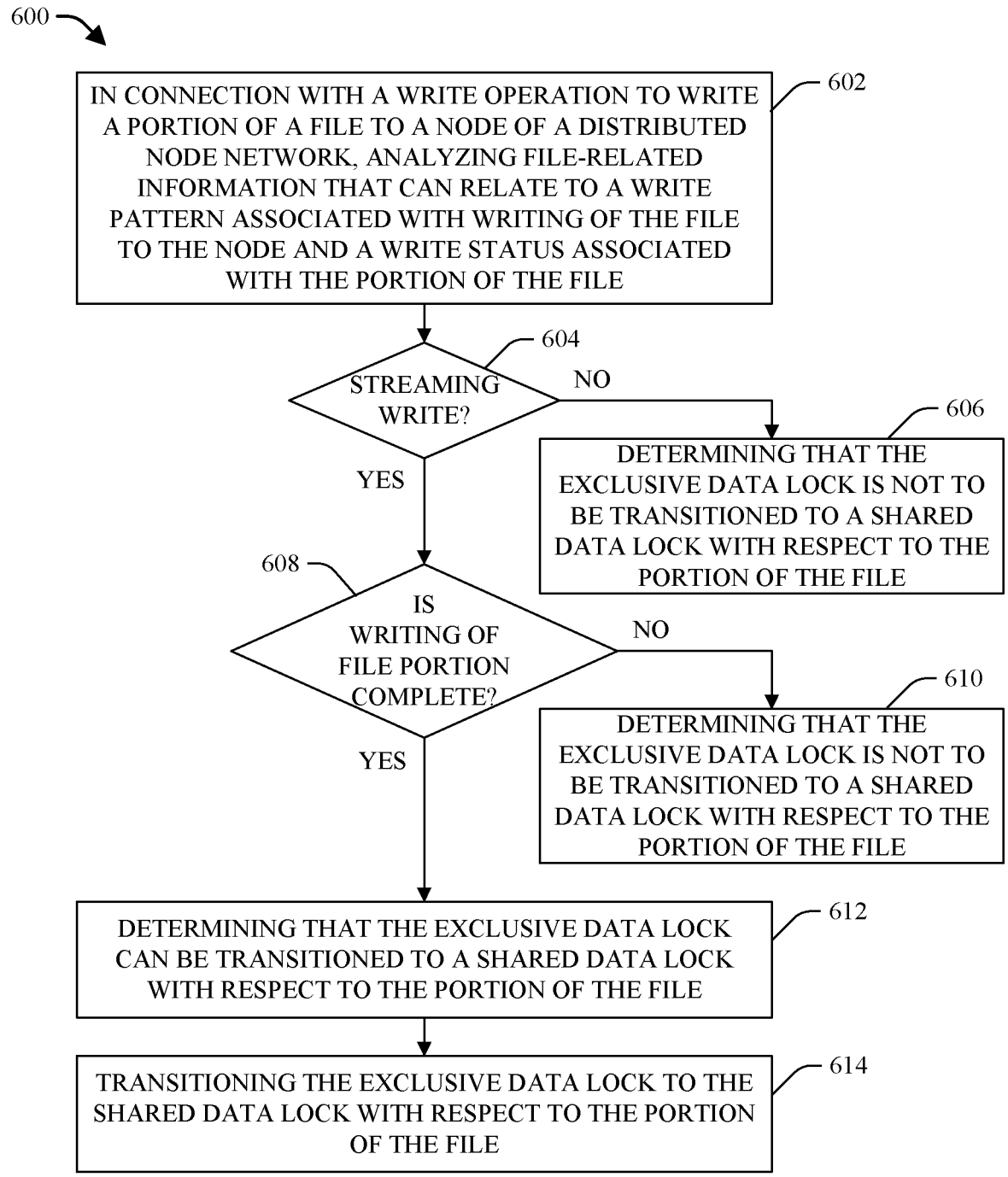
FIG. 6 presents a flow chart of an example method that can desirably perform and manage transitioning an exclusive data lock associated with a portion of a file to a shared data lock based on detection of a streaming write of the file to a node, in accordance with various aspects and embodiments of the disclosed subject matter.

FIG. 6 presents a flow chart of an example method 600 that can desirably (e.g., suitably, efficiently, or optimally) perform and manage transitioning (e.g., proactively transitioning) an exclusive data lock associated with a portion of a file to a shared data lock based on detection of a streaming write of the file to a node, in accordance with various aspects and embodiments of the disclosed subject matter. The method 600 can be employed by, for example, a system comprising the AMC, a processor component (e.g., of or associated with the AMC), and/or data store (e.g., of or associated with the AMC and/or the processor component).

At 602, in connection with a write operation to write a portion of a file to a node of a distributed node network, file-related information can be analyzed, wherein the file-related information can relate to a write pattern associated with writing of the file to the node and a write status associated with the portion of the file. In connection with the write operation, while a client device is writing the file, comprising data, to the node, the AMC can associate an exclusive data lock with the file, or portion thereof, to grant the client device exclusive access to the file, or portion thereof, such as described herein. In connection with the write operation, the AMC can receive and analyze the file-related information. The file-related information can relate to and/or can be indicative of the status associated with the portion (e.g., section, piece, or subset) of the file. In some embodiments, the file-related information can relate to and/or can be indicative whether the writing of the file to the node is a streaming write (e.g., has a streaming sequential write pattern), and, if so, whether the writing of the portion of the file to the node is complete.

At 604, a determination can be made regarding whether the write operation is a streaming write based at least in part on the result of the analyzing. The AMC can determine whether the write operation is a streaming write (e.g., has a streaming write pattern) based at least in part on the result of the analyzing, such as described herein.

If it is determined that the write operation is not a streaming write, at 606, a determination can be made that the exclusive data lock is not to be transitioned to a shared data lock with respect to the portion of the file. For instance, if, based at least in part on the result of the analyzing, the AMC determines that the write operation is not a streaming write (e.g., does not have a streaming write pattern), the AMC can determine that the exclusive data lock is not to be transitioned to a shared data lock with respect to the portion of the file.

Referring again to reference numeral 604, if it is determined that the write operation is a streaming write, at 608, a determination can be made regarding whether the writing of the portion of the file to the node is complete based at least in part on the result of the analyzing. For instance, in response to determining that the write operation is a streaming write, the AMC can determine whether the writing of the portion of the file to the node is complete, based at least in part on the result of the analyzing.

If it is determined that the writing of the portion of the file to the node is not complete, at 610, a determination can be made that the exclusive data lock is not to be transitioned to a shared data lock with respect to the portion of the file. If the AMC determines that the writing of the portion of the file to the node is not complete based at least in part on the result of the analyzing, the AMC can determine that the exclusive data lock is not to be transitioned to a shared data lock with respect to the portion of the file, at least at this time. In some embodiments, in accordance with the method 600, the AMC can continue to monitor the write operation, and can receive and analyze additional file-related information relating to the write operation. If the subsequent analysis of the additional file-related information indicates that the writing of the portion of the file to the node is complete, the AMC can determine that the exclusive data lock can be transitioned to a shared data lock with respect to the portion of the file.

Referring again to reference numeral 608, if it is determined that the writing of the portion of the file to the node is complete, at 612, a determination can be made that the exclusive data lock can be transitioned to a shared data lock with respect to the portion of the file. For example, if, based at least in part on the result of the analyzing, the AMC determines that the writing of the portion of the file to the node is complete, the AMC can determine that the exclusive data lock can be transitioned to a shared data lock with respect to the portion of the file.

At 614, the exclusive data lock can be transitioned to the shared data lock with respect to the portion of the file. In response to determining that the exclusive data lock can be transitioned to a shared data lock with respect to the portion of the file, the AMC can transition (e.g., proactively transition, switch, change, or downgrade) the exclusive data lock to the shared data lock with respect to the portion of the file.

Figure 7:
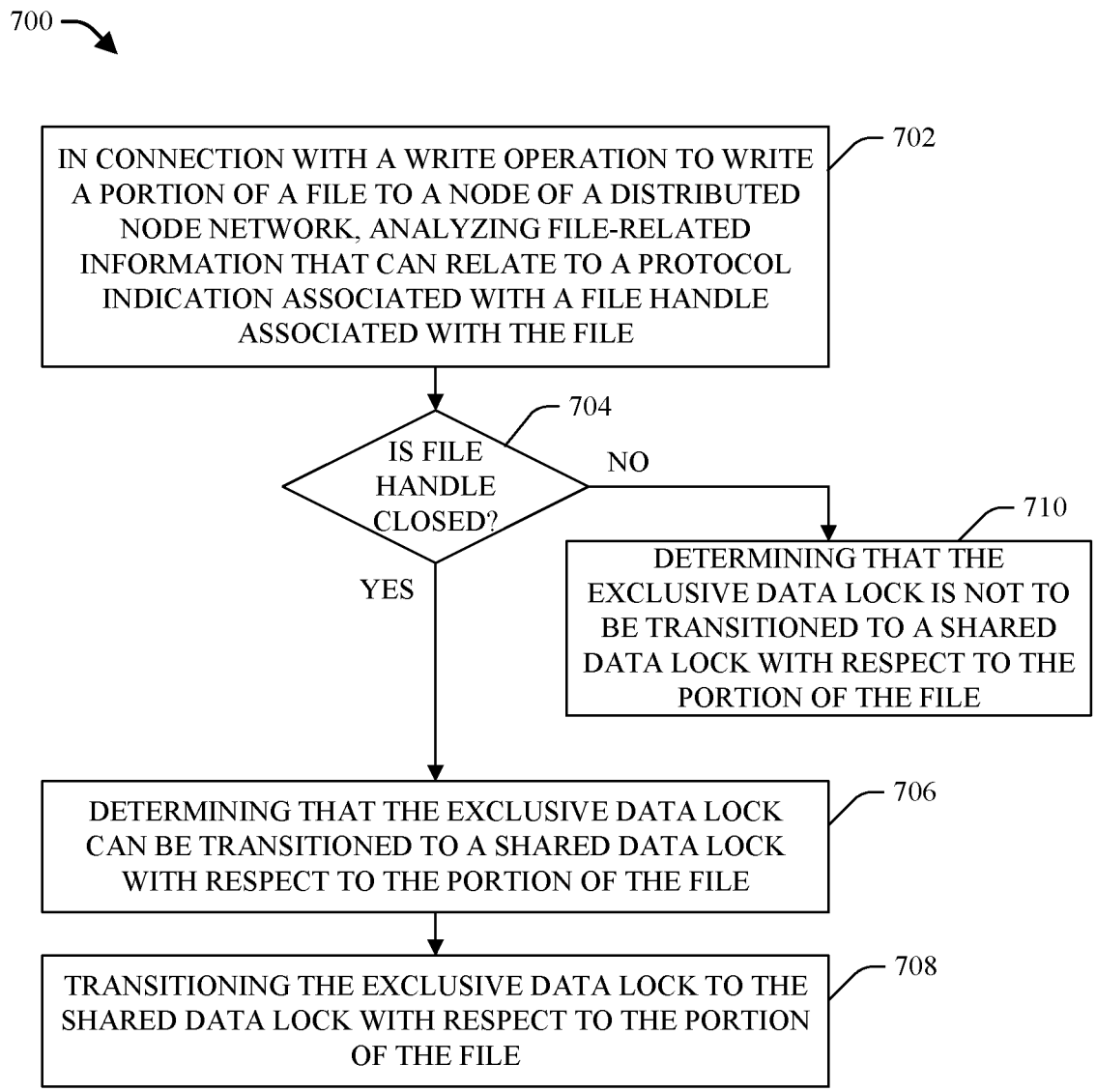
FIG. 7 depicts a flow chart of an example method that can desirably perform and manage transitioning an exclusive data lock associated with a portion of a file to a shared data lock based on a protocol indication relating to a file handle associated with the file, in accordance with various aspects and embodiments of the disclosed subject matter.

FIG. 7 depicts a flow chart of an example method 700 that can desirably (e.g., suitably, efficiently, or optimally) perform and manage transitioning (e.g., proactively transitioning) an exclusive data lock associated with a portion of a file to a shared data lock based on a protocol indication relating to a file handle associated with the file, in accordance with various aspects and embodiments of the disclosed subject matter. The method 700 can be employed by, for example, a system comprising the AMC, a processor component (e.g., of or associated with the AMC), and/or data store (e.g., of or associated with the AMC and/or the processor component).

At 702, in connection with a write operation to write a portion of a file to a node of a distributed node network, file-related information can be analyzed, wherein the file-related information can relate to a protocol indication associated with a file handle associated with the file. For instance, in connection with the write operation, while a client device is writing the file, comprising data, to the node, the AMC can associate an exclusive data lock with the file, or portion thereof, to grant the client device exclusive access to the file, or portion thereof, such as described herein. In connection with the write operation, the AMC can receive and analyze the file-related information. The file-related information can relate to a protocol indication associated with a file handle associated with the file.

At 704, a determination can be made regarding whether the file handle has been closed based at least in part on the result of the analyzing. For example, the AMC can determine whether the file handle associated with the file has been closed based at least in part on the result of the analyzing, such as described herein.

If it is determined that the file handle has been closed, at 706, a determination can be made that the exclusive data lock can be transitioned to a shared data lock with respect to the portion of the file. For instance, if the AMC determines that the file handle has been closed, the AMC can determine that the exclusive data lock can be transitioned to a shared data lock with respect to the portion of the file.

At 708, the exclusive data lock can be transitioned to the shared data lock with respect to the portion of the file. In response to determining that the exclusive data lock can be transitioned to a shared data lock with respect to the portion of the file, the AMC can transition (e.g., proactively transition, switch, change, or downgrade) the exclusive data lock to the shared data lock with respect to the portion of the file.

Referring again to reference numeral 704, if it is determined that the file handle is not closed, at 710, a determination can be made that the exclusive data lock is not to be transitioned to a shared data lock with respect to the portion of the file. For instance, if the AMC determines that the file handle is not closed, the AMC can determine that the exclusive data lock is not to be transitioned to a shared data lock with respect to the portion of the file, at least at this time. In some embodiments, in accordance with the method 700, the AMC can continue to monitor the write operation, and can receive and analyze additional file-related information relating to the write operation, including information relating to a protocol indication associated with the file handle associated with the file. If the subsequent analysis of the additional file-related information indicates that the file handle associated with the file has been closed, the AMC can determine that the exclusive data lock can be transitioned to a shared data lock with respect to the portion of the file, such as indicated at reference numeral 706.

Figure 8:
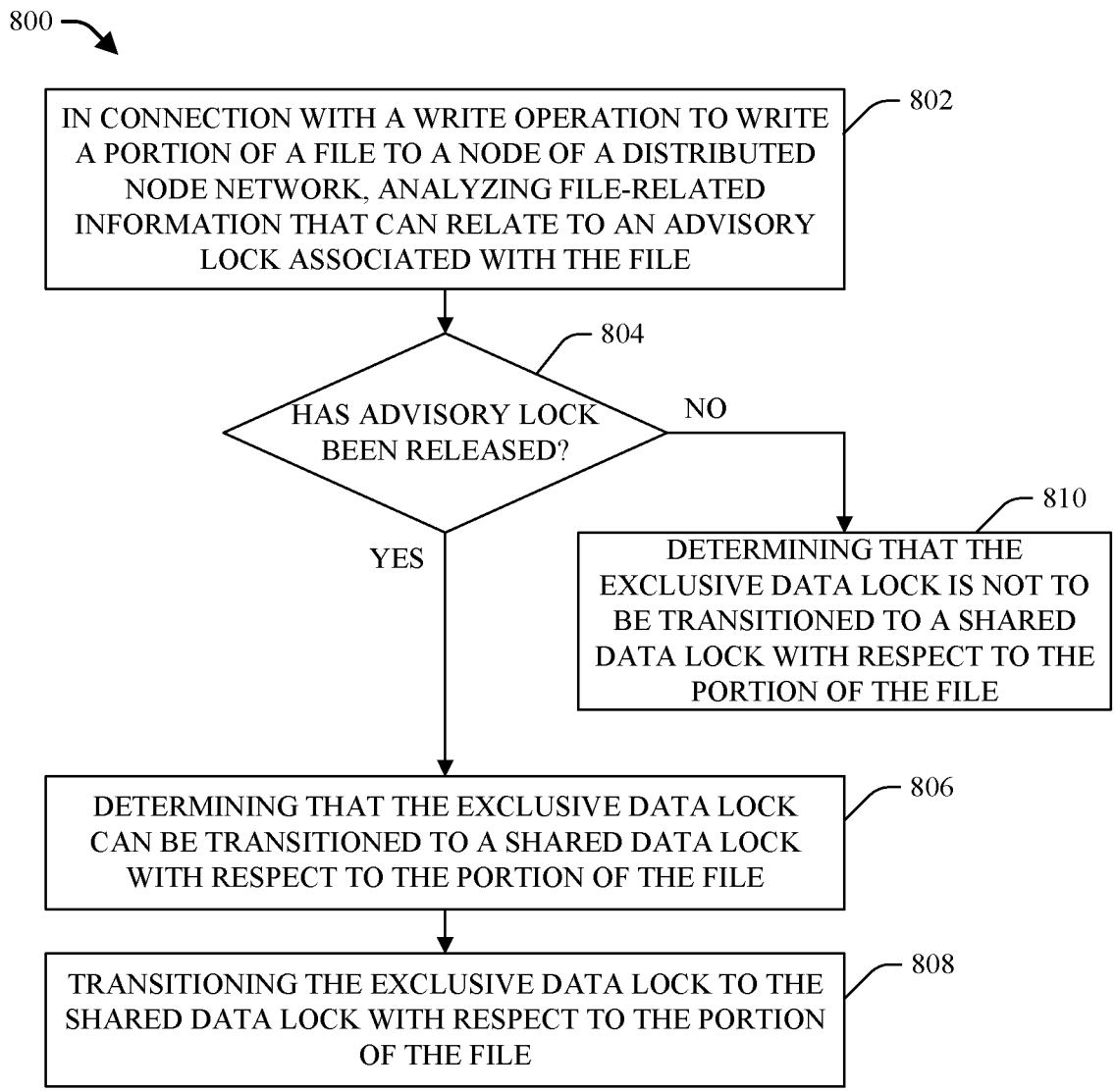
FIG. 8 illustrates a flow chart of an example method that can desirably perform and manage transitioning an exclusive data lock associated with a portion of a file to a shared data lock based on a status of an advisory lock associated with the file, in accordance with various aspects and embodiments of the disclosed subject matter.

FIG. 8 illustrates a flow chart of an example method 800 that can desirably (e.g., suitably, efficiently, or optimally) perform and manage transitioning (e.g., proactively transitioning) an exclusive data lock associated with a portion of a file to a shared data lock based on a status of an advisory lock associated with the file, in accordance with various aspects and embodiments of the disclosed subject matter. The method 800 can be employed by, for example, a system comprising the AMC, a processor component (e.g., of or associated with the AMC), and/or data store (e.g., of or associated with the AMC and/or the processor component).

At 802, in connection with a write operation to write a portion of a file to a node of a distributed node network, file-related information can be analyzed, wherein the file-related information can relate to an advisory lock associated with the file. In connection with the write operation, while a client device is writing the file, comprising data, to the node, the AMC can associate an exclusive data lock with the file, or portion thereof, to grant the client device exclusive access to the file, or portion thereof, such as described herein. In connection with the write operation, the AMC can receive and analyze the file-related information. The file-related information can relate to an advisory lock (e.g., a status of a higher level advisory lock) associated with the file.

At 804, a determination can be made regarding whether the advisory lock has been released by the client device based at least in part on the result of the analyzing. For example, the AMC can determine whether the advisory lock has been released by the client device based at least in part on the result of the analyzing, such as described herein.

If it is determined that the advisory lock has been released by the client device, at 806, a determination can be made that the exclusive data lock can be transitioned to a shared data lock with respect to the portion of the file. For instance, if the AMC determines that the advisory lock has been released by the client device, the AMC can determine that the exclusive data lock can be transitioned to a shared data lock with respect to the portion of the file.

At 808, the exclusive data lock can be transitioned to the shared data lock with respect to the portion of the file. In response to determining that the exclusive data lock can be transitioned to a shared data lock with respect to the portion of the file, the AMC can transition (e.g., proactively transition, switch, change, or downgrade) the exclusive data lock to the shared data lock with respect to the portion of the file.

Referring again to reference numeral 804, if it is determined that the advisory lock has not been released by the client device, at 810, a determination can be made that the exclusive data lock is not to be transitioned to a shared data lock with respect to the portion of the file. For example, if the AMC determines that the advisory lock has not been released by the client device, the AMC can determine that the exclusive data lock is not to be transitioned to a shared data lock with respect to the portion of the file, at least at this time. In some embodiments, in accordance with the method 800, the AMC can continue to monitor the write operation, and can receive and analyze additional file-related information relating to the write operation, including information relating to the advisory lock associated with the file. If the subsequent analysis of the additional file-related information indicates that the advisory lock has been released by the client device, the AMC can determine that the exclusive data lock can be transitioned to a shared data lock with respect to the portion of the file, such as indicated at reference numeral 806.

Figure 9:
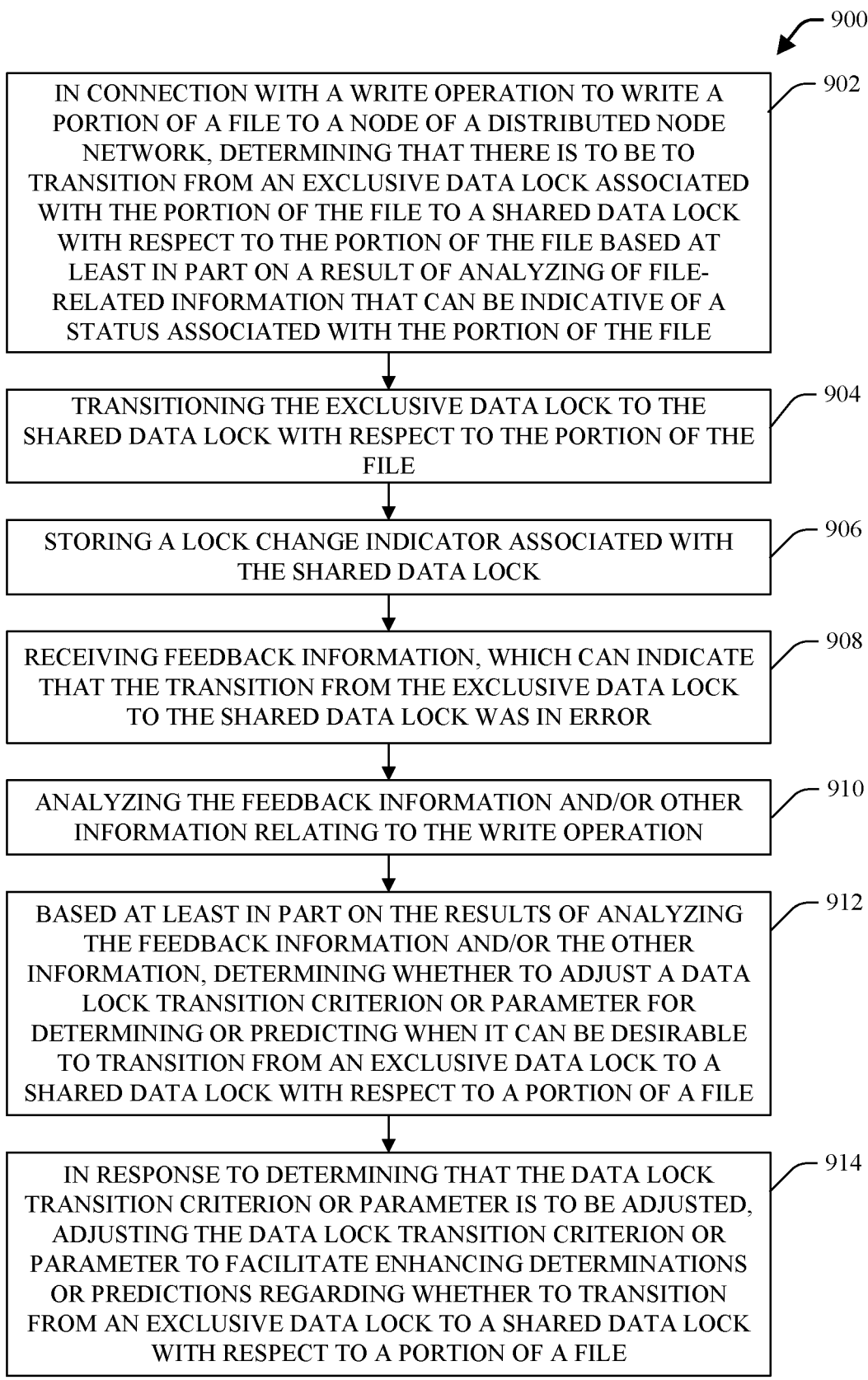
FIG. 9 illustrates a flow chart of an example method that can desirably manage data lock transitions based on feedback information relating to data lock transition determinations or predictions, in accordance with various aspects and embodiments of the disclosed subject matter.

FIG. 9 illustrates a flow chart of an example method 900 that can desirably (e.g., suitably, efficiently, or optimally) manage data lock transitions based on feedback information relating to data lock transition determinations or predictions, in accordance with various aspects and embodiments of the disclosed subject matter. The method 900 can be employed by, for example, a system comprising the AMC, a processor component (e.g., of or associated with the AMC), and/or data store (e.g., of or associated with the AMC and/or the processor component).

At 902, in connection with a write operation to write a portion of a file to a node of a distributed node network, a determination can be made to transition from an exclusive data lock associated with the portion of the file to a shared data lock with respect to the portion of the file based at least in part on a result of analyzing of file-related information that can be indicative of a status associated with the portion of the file. At 904, the exclusive data lock can be transitioned to the shared data lock with respect to the portion of the file. The AMC can determine that the exclusive data lock associated with the portion of the file is to be transitioned to the shared data lock with respect to the portion of the file, based at least in part on the result of the analyzing of the file-related information. For example, based at least in part on the result of the analyzing of the file-related information, the AMC can determine that the write operation is a streaming write (e.g., the write operation has a streaming write pattern), and the writing of the portion of the file to the node is complete, and, as a result, can determine that the exclusive data lock can be transitioned to the shared data lock with respect to the portion of the file. Accordingly, the AMC can transition the exclusive data lock can be transitioned to the shared data lock with respect to the portion of the file.

At 906, a lock change indicator associated with the shared data lock can be stored. The AMC can generate the lock change indicator (e.g., lock downgrade indicator or flag) to indicate that the exclusive data lock has been transitioned to the shared data lock with respect to the portion of the file. The AMC can associate the lock change indicator with the shared data lock, and can store the shared data lock in a desired storage location (e.g., the memory component, such as cache memory, and/or the data store).

At 908, feedback information, which can indicate that the transition from the exclusive data lock to the shared data lock was in error, can be received. The AMC can receive the feedback information from the node, a client device (e.g., client device performing the write operation), a client (e.g., a client performing the write operation), and/or another entity. The feedback information can indicate that the writing of the portion of the file, comprising data, to the node is not complete, such as described herein.

At 910, the feedback information and/or other information relating to the write operation can be analyzed. The AMC can analyze the feedback information and/or the other information relating to the write operation to facilitate determining whether to adjust a data lock transition criterion or parameter for determining when it can be desirable (e.g., wanted, appropriate, or optimal) to transition from an exclusive data lock to a shared data lock with respect to a portion of a file (e.g., a subsequent write operation involving a portion of another file), in accordance with the defined access management criteria. The other information can relate to, for example, the client device, the client, the node, a type of data, a number of writes (e.g., consecutive write sub-operations) that occurred, or other characteristic (e.g., attribute, property, or parameter) associated with the write operation(s).

At 912, based at least in part on the results of analyzing the feedback information and/or the other information, a determination can be made regarding whether to adjust a data lock transition criterion or parameter for determining or predicting when it can be desirable to transition from an exclusive data lock to a shared data lock with respect to a portion of a file. The AMC can determine whether to adjust the data lock transition criterion or parameter for determining or predicting when it can be desirable (e.g., wanted, appropriate, or optimal) to transition from an exclusive data lock to a shared data lock with respect to a portion of a file (e.g., a subsequent write operation involving a portion of another file), in accordance with the defined access management criteria.

At 914, in response to determining that the data lock transition criterion or parameter is to be adjusted, the data lock transition criterion or parameter can be adjusted to facilitate enhancing determinations or predictions regarding whether to transition from an exclusive data lock to a shared data lock with respect to a portion of a file. In response to determining that the data lock transition criterion or parameter is to be adjusted, the AMC can adjust (e.g., modify, change, or alter) the data lock transition criterion or parameter to facilitate enhancing determinations or predictions regarding whether to transition from an exclusive data lock to a shared data lock with respect to a portion of a file. For instance, the AMC can adjust the data lock transition criterion or parameter to make such data lock transition determinations or predictions less aggressive (e.g., can increase the number of consecutive write sub-operations of a write operation that have to occur to determine or predict that the write operation is a streaming write). In some embodiments, the AMC can apply such adjustment of the data lock transition criterion or parameter to all write operations. In other embodiments, the AMC can selectively apply (e.g., only apply) such adjustment of the data lock transition criterion or parameter to write operations based at least in part on the client device, the client, the type of data, or other characteristic associated with a write operation (e.g., can apply such adjustment to other write operations involving the same client device, same client, same type of data, and/or other same type of characteristic) associated with the write operation associated with the data lock transition that was in error or otherwise undesired.

Figure 10:
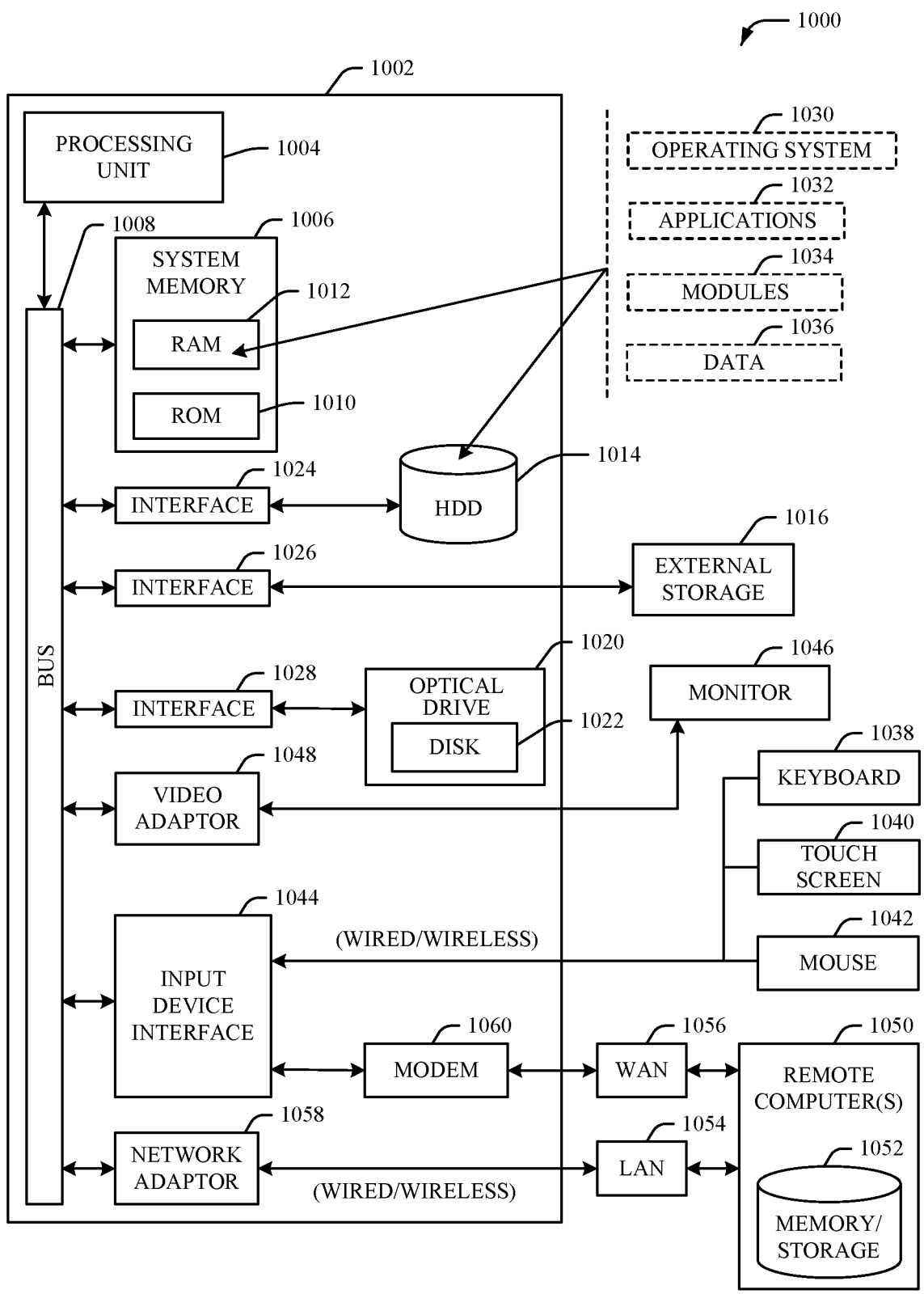
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out: anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHZ radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors: single-processors with software multithread execution capability: multi-core processors: multi-core processors with software multithread execution capability: multi-core processors with hardware multithread technology: parallel platforms: and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IOT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A: X employs B: or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., node, cluster, network, AMC, lock manager component, detector component, feedback component, adjuster component, interfaces, processor component, data store, memory component, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
in connection with a write operation to write a portion of a file to a node of a distributed node network, analyzing, by a system comprising at least one processor, file-related information indicative of a status associated with the portion of the file;
determining, by the system, whether to transition from an exclusive data lock associated with the portion of the file to a shared data lock with respect to the portion of the file based on a result of the analyzing of the file-related information;
based on the result, determining, by the system, that a write pattern associated with the write of the portion of the file to the node is a streaming write pattern and that the write of the portion of the file to the node is completed; and
based on the determining that the write pattern is the streaming write pattern and that the write of the portion of the file to the node is completed, determining, by the system, that the exclusive data lock associated with the portion of the file is to be transitioned to the shared data lock with respect to the portion of the file.

2. The method of claim 1, wherein the node is a first node, wherein the distributed node network comprises the first node and a second node, wherein the exclusive data lock grants, to a first client device associated with the distributed node network, exclusive access to the portion of the file stored in the first node, wherein the shared data lock, in response to being implemented, is able to grant, to multiple client devices, comprising a second client device, associated with the distributed node network, shared or concurrent access to the portion of the file stored in the first node, and wherein the second client device is associated with the second node or the first node.

3. The method of claim 1, wherein the file-related information is first file-related information, wherein the write pattern is a first write pattern, wherein the portion of the file is a first portion of a first file, wherein the result is a first result, wherein the streaming write pattern is a first streaming write pattern,
wherein second file-related information relates to a second write pattern associated with writing of a second portion of a second file to the node and a write status associated with the second portion of the second file, and wherein the method further comprises:
analyzing, by the system, the second file-related information; and
based on a second result of analyzing of the second file-related information, determining, by the system, whether the second write pattern associated with the writing of the second portion of the second file to the node is a second streaming write pattern.

4. The method of claim 3, wherein the exclusive data lock is a first exclusive data lock, wherein the shared data lock is a first shared data lock, and wherein the method further comprises:
in response to determining that the second write pattern is not the second streaming write pattern based on the second result, determining, by the system, that a second exclusive data lock associated with the second portion of the second file is not to be transitioned to a second shared data lock with respect to the second portion of the second file.

5. The method of claim 3, wherein the exclusive data lock is a first exclusive data lock, wherein the shared data lock is a first shared data lock, and wherein the method further comprises:
in response to determining that the second write pattern is the second streaming write pattern based on the second result, determining, by the system, whether writing of the second portion of the second file to the node is completed based on the second result; and
in response to determining that the second write pattern is the second streaming write pattern and determining that the writing of the second portion of the second file to the node is completed, determining, by the system, that a second exclusive data lock associated with the second portion of the second file is to be transitioned to a second shared data lock with respect to the second portion of the second file.

6. The method of claim 3, wherein the exclusive data lock is a first exclusive data lock, wherein the shared data lock is a first shared data lock, and wherein the method further comprises:
in response to determining that the second write pattern is the second streaming write pattern based on the second result, determining, by the system, whether writing of the second portion of the second file to the node is completed; and
in response to determining that the second write pattern is the second streaming write pattern and determining that the writing of the second portion of the second file to the node is not completed, determining, by the system, that a second exclusive data lock associated with the second portion of the second file is not to be transitioned to a second shared data lock with respect to the second portion of the second file.

7. The method of claim 1, wherein the file-related information is first file-related information, wherein the portion of the file is a first portion of a first file, wherein the result is a first result, wherein the exclusive data lock is a first exclusive data lock, wherein the shared data lock is a first shared data lock, wherein second file-related information relates to a protocol indication associated with a file handle associated with a second file written or being written to, and stored, in the node, and wherein the method further comprises:
analyzing, by the system, the second file-related information; and
one of:
in response to the protocol indication being determined to indicate that the file handle has been closed based on a second result of analyzing of the second file-related information, determining, by the system, that a second exclusive data lock associated with a second portion of the second file is to be transitioned to a second shared data lock with respect to the second portion of the second file; or in response to the protocol indication being determined to indicate that the file handle is not closed based on the second result of analyzing of the second file-related information, determining, by the system, that the second exclusive data lock is not to be transitioned to the second shared data lock with respect to the second portion of the second file.

8. The method of claim 1, wherein the file-related information is first file-related information, wherein the portion of the file is a first portion of a first file, wherein the result is a first result, wherein the exclusive data lock is a first exclusive data lock, wherein the shared data lock is a first shared data lock, wherein second file-related information relates to an advisory lock associated with the second file written or being written to, and stored, in the node, and wherein the method further comprises:

analyzing, by the system, the second file-related information;

based on a second result of analyzing of the second file-related information, determining, by the system, whether the advisory lock associated with the second file has been released by a client device that is writing the second file to the node; and one of:

in response to determining that the advisory lock has been released, determining, by the system, that a second exclusive data lock associated with a second portion of the second file is to be transitioned to a second shared data lock with respect to the second portion of the second file; or in response to determining that the advisory lock is not released, determining, by the system, that the second exclusive data lock associated with the second portion of the second file is not to be transitioned to the second shared data lock with respect to the second portion of the second file.

9. The method of claim 1, further comprising:

in response to determining that the exclusive data lock associated with the portion of the file is to be transitioned to the shared data lock with respect to the portion of the file based on the result, transitioning, by the system, from the exclusive data lock to the shared data lock with respect to the portion of the file.

10. The method of claim 9, wherein the portion of the file is stored in a cache memory of the node, and wherein the method further comprises:

receiving, by the system, a read request from a client device, wherein the read request requests to read the portion of the file; and in response to receiving the read request, and in response to determining that the shared data lock is associated with the portion of the file, granting, by the system, access to the portion of the file to the client device to allow the client device to read the portion of the file from the cache memory of the node.

11. The method of claim 9, wherein the result is a first result, and wherein the method further comprises:

storing, by the system, metadata associated with the shared data lock, wherein the metadata indicates that the exclusive data lock associated with the portion of the file was proactively transitioned to the shared data lock;

receiving, by the system, feedback information from the node or a client device associated with writing of the file to the node, wherein the feedback information indicates whether the transition from the exclusive data lock to the shared data lock with respect to the portion of the file was in error; and based on a second result of analyzing the feedback information and the metadata, determining, by the system, whether the transition from the exclusive data lock to the shared data lock with respect to the portion of the file was in error.

12. The method of claim 11, wherein the exclusive data lock is a first exclusive data lock, wherein the shared data lock is a first shared data lock, wherein the portion of the file is a first portion of a first file, wherein the node is a first node, wherein the distributed node network comprises the first node and a second node, and wherein the method further comprises:

in response to determining that the transition from the first exclusive data lock to the first shared data lock with respect to the first portion of the first file was in error based on the second result, adjusting, by the system, a determination or prediction process relating to determining or predicting whether to transition from a second exclusive data lock associated with a second portion of a second file to a second shared data lock with respect to the second portion of the second file, to facilitate mitigating potential error associated with the determining or the predicting of whether to transition the second exclusive data lock to the second shared data lock in connection with writing of the second portion of the second file to the first node or the second node.

13. A system, comprising: at least one memory that stores computer executable components; and at least one processor that executes computer executable components stored in the at least one memory, wherein the computer executable components comprise: a node of a distributed network of nodes; and an access manager that, with regard to a section of a file written or being written to, and stored, in the node, analyzes file-related data indicative of a status associated with the section of the file, and, based on a result of the analysis of the file-related data, determines whether to switch from a first data lock associated with the section of the file to a second data lock with respect to the section of the file wherein, based on the result, the access manager determines that a write pattern associated with the write of the section of the file to the node is a streaming write pattern and that the write of the section of the file to the node is finished, and wherein, based on determining that the write pattern is the streaming write pattern and that the write of the section of the file to the node is finished, the access manager determines that the first data lock associated with the section of the file is to be switched to the second data lock with respect to the section of the file.

14. The system of claim 13, wherein the first data lock is an exclusive data lock, wherein the second data lock is a shared data lock, wherein the node is a first node, wherein the distributed network of nodes comprises the first node and a second node, wherein the exclusive data lock grants, to a first client device associated with the distributed network of nodes, exclusive access to the section of the file stored in the first node, wherein the shared data lock, in response to being executed, is able to grant, to multiple client devices, comprising a second client device, associated with the distributed network of nodes, shared or concurrent access to the section of the file stored in the first node, and wherein the second client device is associated with the second node or the first node.

15. The system of claim 13, wherein the file-related data is first file-related data, wherein the write pattern is a first write pattern, wherein the section of the file is a first section of a first file, wherein the result is a first result, wherein the streaming write pattern is a first streaming write pattern,
wherein second file-related data relates to a second write pattern associated with writing of a second section of a second file, comprising data, to the node and a write status associated with writing of the second section of the second file to the node, and
wherein, based on a second result of an analysis of the second file-related data, the access manager determines whether the second write pattern associated with writing of the second section of the second file to the node is a second streaming write pattern.

16. The system of claim 15, wherein, in response to determining that the second write pattern is not the second streaming write pattern based on the second result, the access manager determines that a third data lock associated with the second section of the second file is not to be switched to a fourth data lock with respect to the second section of the second file.

17. The system of claim 15, wherein, in response to determining that the second write pattern is the second streaming write pattern based on the second result, the access manager determines whether writing of the second section of the second file to the node is finished based on the second result, and
wherein, in response to determining that the second write pattern is the second streaming write pattern and determining that the writing of the second section of the second file to the node is finished, the access manager determines that a third data lock associated with the second section of the second file is to be switched to a fourth data lock with respect to the second section of the second file, and switches from the third data lock to the fourth data lock with respect to the second section of the second file.

18. The system of claim 13, wherein the file-related data is first file-related data, wherein the section of the file is a first section of a first file, wherein the result is a first result, wherein second file-related data relates to a protocol indication associated with a file handle associated with a second file written or being written to, and stored, in the node, and wherein one of:
in response to the access manager determining that the protocol indication indicates that the file handle is closed based on a second result of an analysis of the second file-related data, the access manager determines that a third data lock associated with the second section of the second file is to be switched to a fourth data lock with respect to the second section of the second file; or
in response to the access manager determining that the protocol indication indicates that the file handle is not closed based on the second result of the analysis of the second file-related data, the access manager determines that the third data lock is not to be switched to the fourth data lock with respect to the second section of the second file.

19. A non-transitory machine-readable medium, comprising executable instructions that, when executed by at least one processor, facilitate performance of operations, comprising: with regard to a write operation to write a section of a file to a node device of a distributed network of node devices, evaluating file-related data indicative of a status associated with the writing of the section of the file to the node device; determining whether to change an exclusive data lock mode associated with the section of the file to a shared data lock mode with respect to the section of the file based on a result of the evaluating of the file-related data; based on the result, determining that a write pattern associated with the writing of the section of the file to the node device is not a streaming write pattern, or is the streaming write pattern with the writing of the section of the file to the node device not being completed; and based on the determining that the write pattern is not the streaming write pattern, or is the streaming write pattern with the writing of the section of the file to the node device not being completed, determining that the exclusive data lock mode associated with the section of the file is not to be changed to the shared data lock mode with respect to the section of the file.

20. The non-transitory machine-readable medium of claim 19, wherein the node device is a first node device, wherein the distributed network of node devices comprises the first node device and a second node device, wherein the exclusive data lock mode grants, to a first device associated with the distributed network of node devices, exclusive access to the section of the file stored in the first node device, wherein the shared data lock mode, in response to being implemented, is able to grant, to multiple devices, comprising a second device, associated with the distributed network of node devices, shared or simultaneous access to the section of the file stored in the first node device, and wherein the second device is associated with the second node device or the first node device.

* * * * *